US012730811B2

(12) United States Patent
Chong et al.

(10) Patent No.: US 12,730,811 B2
(45) Date of Patent: Sep. 8, 2026

(54) AUTOMATIC REGRESSION MANAGEMENT FOR MULTI-TENANT DATABASES

(71) Applicant: SAP SE, Walldorf (DE)

(72) Inventors: Jaehyok Chong, Seoul (KR); Sanghee Lee, Seoul (KR); Heesik Shin, Seoul (KR); Ki Hong Kim, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/661,202

(22) Filed: May 10, 2024

(65) Prior Publication Data

US 2025/0348492 A1 Nov. 13, 2025

(51) Int. Cl.
*G06F 15/16* (2006.01)
*G06F 11/34* (2006.01)
*G06F 16/2453* (2019.01)
*G06F 16/2455* (2019.01)

(52) U.S. Cl.
CPC .... *G06F 16/24545* (2019.01); *G06F 11/3409* (2013.01); *G06F 16/2456* (2019.01)

(58) Field of Classification Search
None
See application file for complete search history.

(56) References Cited

U.S. PATENT DOCUMENTS 10,802,944 B2 10/2020 Toal et al.
11,544,263 B2 1/2023 Hwang et al.
11,556,538 B2 1/2023 Bok et al.
11,734,116 B1 * 8/2023 Bunescu ............ G06F 16/2358 714/38.1
11,748,349 B2 9/2023 Chang et al.
11,803,545 B1 10/2023 Chong
11,907,217 B2 2/2024 Bok et al.
12,001,432 B1 * 6/2024 Burger .............. G06F 16/24545
2009/0106321 A1 * 4/2009 Das .................. G06F 16/24542

(Continued)

FOREIGN PATENT DOCUMENTS

JP 2023-536302 8/2023

OTHER PUBLICATIONS

Klemm, "SAP IBP on SAP HANA Cloud—a Paradigm Shift for Cloud Innovation," https://community.sap.com/t5/supply-chain-management-blogs-by-sap/sap-ibp-on-sap-hana-cloud-a-paradigm-shift-for-cloud-innovation/ba-p/13549621, 9 pages (accessed Mar. 18, 2024).

(Continued)

*Primary Examiner* — Alex Gofman
(74) *Attorney, Agent, or Firm* — Klarquist Sparkman, LLP

(57) ABSTRACT

A computer implemented method can detect, in a first tenant, performance regression of executing a query using a current query plan. Responsive to detecting the performance regression, the method can evaluate one or more candidate solutions for resolving the performance regression, and identify, from the one or more candidate solutions, an effective solution that resolves the performance regression. The effective solution is configured to generate an updated query plan, which has better performance than the current query plan for executing the query. The method can construct a knowledge object based on the detected performance regression and the identified effective solution and distribute the knowledge object to a second tenant. Related systems and software for implementing the method are also disclosed.

20 Claims, 12 Drawing Sheets

(56) References Cited

U.S. PATENT DOCUMENTS

2012/0084315 A1* 4/2012 Schneider ......... G06F 16/24558 707/769
2012/0130986 A1 5/2012 Abdellatif
2014/0310249 A1* 10/2014 Kowalski ............ G06F 16/2455 707/688
2014/0317088 A1 10/2014 Al-Omari
2015/0186253 A1 7/2015 Abraham
2017/0147639 A1* 5/2017 Lee ................... G06F 16/24539
2019/0095470 A1 3/2019 Dundjerski
2019/0332376 A1 10/2019 Borra et al.
2020/0311074 A1* 10/2020 Lee ....................... G06F 16/252
2021/0303571 A1 9/2021 Chang et al.
2021/0357407 A1 11/2021 Bok et al.
2023/0048513 A1* 2/2023 Gao .................... G06F 11/0793
2024/0054127 A1 2/2024 Chakkappen
2024/0126607 A1 4/2024 Royal et al.
2024/0330370 A1* 10/2024 Schilders .......... G06F 16/90335
2025/0077515 A1* 3/2025 Sun ................... G06F 16/24542

OTHER PUBLICATIONS

"SAP Hana Troubleshooting and Performance Analysis Guide," https://help.sar.com/docs/SAP_HAHA_PLATFORM/bed8c14f9f024763b0777aa72b5436f6?locale=en-US&state=PRODUCTION&version=2.0.07, 6 pages (accessed Mar. 14, 2024).

Owen, "Time Series Anomaly Detection: Simple Yet Powerful Approaches," https://medium.com/bukalapak-data/time-series-anomaly-detection-simple-yet-powerful-approaches-4449ffe1ca12, 30 pages (accessed Mar. 6, 2024).

Extended European Search Report, European Application No. 24213792.5, 8 pages, May 7, 2025.

Jung et al., "APOLLO: Automatic Detection and Diagnosis of Performance Regressions in Database Systems", 2019.

First Office Action, Japanese Application No. 2024-204033, Aug. 4, 2026, 6 pages (with machine translation).

* cited by examiner

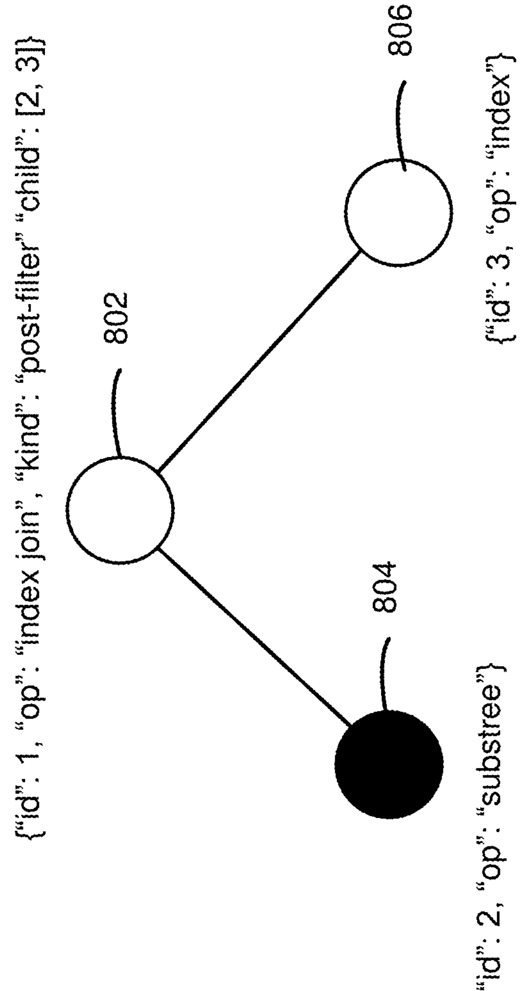
FIG. 8
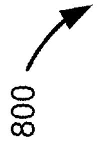

900

```
{
 "type": "subtree pattern",
  "pattern": {
   "operators": [
     {"id": 1, "op": "index join", "kind": "post-filter", "child": [2, 3]},
     {"id": 2, "op": "subtree"}, // any kind of operator
     {"id": 3, "op": "index"}  // any index or table index
   ],
   "root": 1,
   "conditions": [{"id": 1, "kind": "estimation error", "threshold": 1000}]
  },
  "solution": {"kind": "SQL Hint", "details": "NO_HEX_INDEX_JOIN"}
}
```

FIG. 9

```
{
 “type”: “statement”,
  “pattern”: {“statement string”: “SELECT * FROM T WHERE A = $$%$$”},
  “solution”: {“kind”: “Statement Hint”, “details”: “NO_HEX_INDEX_JOIN”}
}
```

AUTOMATIC REGRESSION MANAGEMENT FOR MULTI-TENANT DATABASES

BACKGROUND

A query plan (also referred to as "query execution plan") is a sequence of steps that a database management system (DBMS) executes in order to complete a structured query language (SQL) query. When a query is run for the first time in the DBMS, the query can be compiled by a query optimizer to generate a corresponding query plan, which can be stored in memory called "query plan cache," or simply "plan cache." Thus, when the same query is run again, the DBMS does not need to regenerate the query plan. Instead, it can reuse the cached query plan stored in the plan cache, thereby improving efficiency of the DBMS.

Even for the same query, the query plan generated by the query optimizer can change over time, e.g., due to system upgrade to the database or other reasons. While a system upgrade often leads to performance improvement of query plans, performance regression of query plans can occur in certain circumstances. Managing these performance regressions can be challenging due to the sheer number of queries and the complexity of the systems involved. It requires a deep understanding of the query processing engine and the ability to predict how changes in one part of the system might affect the performance of queries. Furthermore, manual management of these regressions is not scalable, especially in large-scale systems with numerous queries running concurrently. Thus, there remains a need for automated solutions that can detect and handle performance regressions in an efficient and reliable manner.

BRIEF DESCRIPTION OF THE DRAWINGS

FIG. 8 depicts a subtree of an example query plan.

FIG. 9 depicts an example knowledge object including a pattern definition specifying a pattern of the subtree of FIG. 8.

DETAILED DESCRIPTION

Overview of Query Plan Performance Regression

Figure 1:
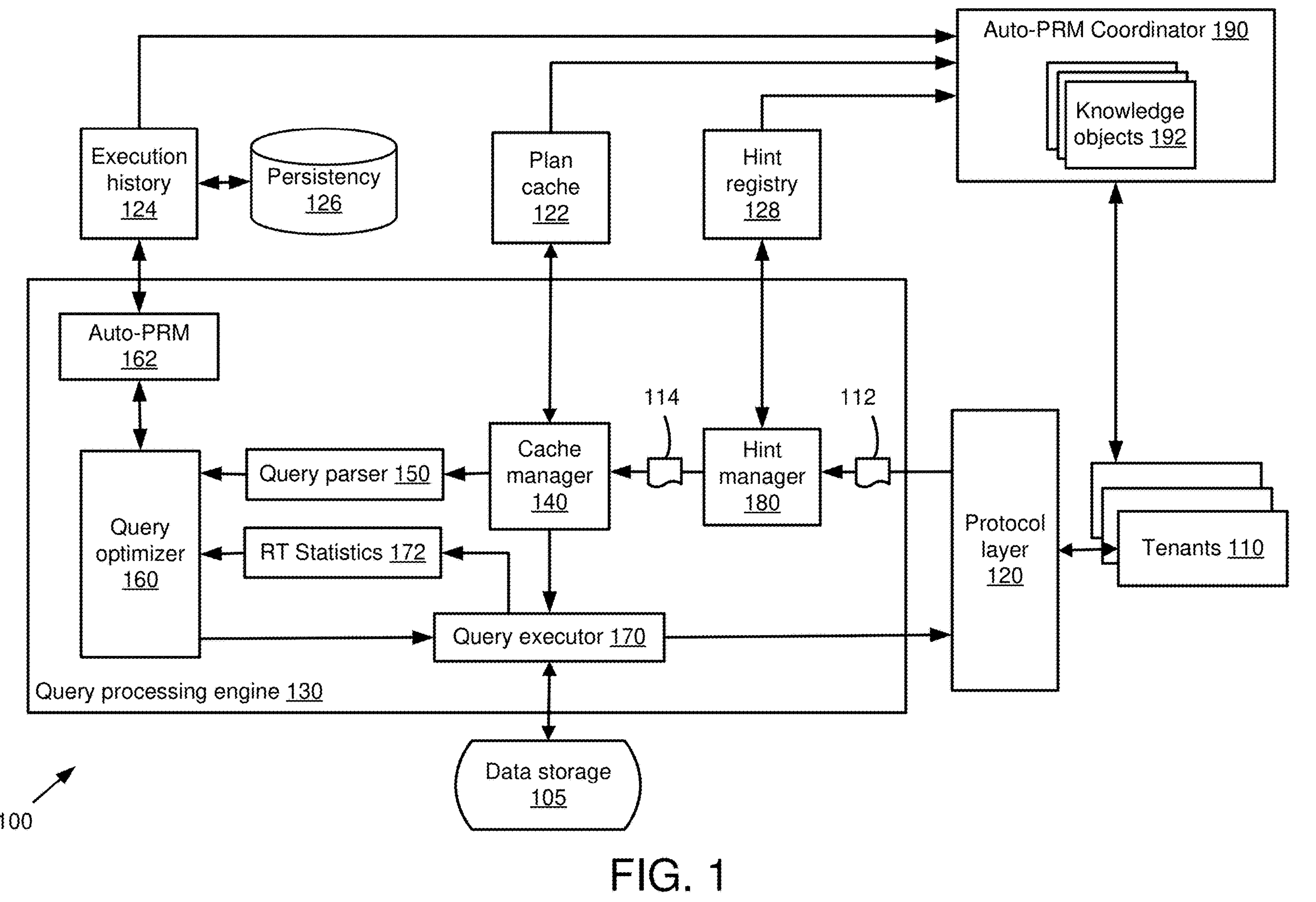
FIG. 1 is an overall block diagram of an example database management system supporting automatic performance regression management.

The aim of query optimization is to select a query plan (from many candidate query plans) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best plan may not be selected, but the selected plan is deemed better than others based on data available to the optimizer.

The stability of a single query's performance can be quite volatile due to its heavy reliance on the decisions made by the query optimizer. These decisions are often based on uncertainty, and in most cases, they reflect changes in the base data, generating execution plans that are equivalent or superior in terms of performance. However, there are instances where performance regressions occur, meaning the altered query plans perform worse than their predecessors.

One common type of performance regression is a long-running query that takes longer than expected to respond. This is measured by the query's execution time (also referred to as "response time" or "elapsed time"). In some circumstances, a long execution time can be considered a regression even if the overall CPU consumption by a query plan has decreased, as this could indicate that the system resources are not being fully utilized.

Another type of performance regression is high CPU time consumption. While using multiple threads and a lot of CPU time can reduce the response time, it can also lead to a single query consuming a significant amount of system resources. This can impact the performance of other queries running simultaneously and consequently lower the overall workload throughput. Moreover, high peak memory consumption by a single query can also lead to performance regression. Like the CPU time consumption, high peak memory consumption can affect the performance of other queries and result in lower workload throughput in the customer's system.

As described herein, the superiority of one query plan over another is determined by its performance, which is evaluated based on predefined criteria. These criteria can involve multiple metrics, such as execution time, CPU time consumption, and/or peak memory consumption. A better query plan is one that optimizes one or more of these metrics, resulting in shorter response times, efficient use of system resources, and/or higher workload throughput. In certain circumstances, these metrics can be combined into a composite score to provide a holistic view of the query plan's performance. The specific weights assigned to each metric in the composite score can vary depending on the system's requirements and the nature of the workload.

In a DBMS, performance regression can occur for a variety of reasons. One major cause of performance regressions is changes in the system's coding. For example, when a system undergoes an upgrade, the query plans for various queries may change due to alterations in the code related to the underlying query optimization algorithm, such as logical equivalent plan enumeration rules, physical algorithm enumeration rules, and/or size estimation and cost calculation. While normally these changes can result in improved performance, there are instances where they lead to regressions.

Another factor contributing to performance regression is skew in data distribution. For instance, if the values in a column of a database table are skewed, the query optimizer's size estimation often fails to predict a reasonable result size for an operation. This inaccurate size estimation can lead the query optimizer to generate a sub-optimal query plan for a query, resulting in a performance regression.

Changes in data distribution can also lead to performance regressions. For example, if a table's record count changes significantly, a previously compiled and cached plan on the table can be automatically recompiled to generate a plan that better reflects the recent data distribution. However, a performance regression may occur if the newly compiled plan is slower than the previously compiled one.

Record sampling for size estimation can also cause performance regressions. In certain cases, histograms can be used to represent the distribution of values in a column of a table. However, in the absence of a histogram, sampling can be used to estimate filter selectivity or join selectivity. This means that different values can be used whenever size estimation is performed, potentially leading to changes in the resulting plan. These changes can cause performance regression.

Further, the process of compiling queries with specific parameter values can sometimes lead to performance regressions. In certain scenarios, the query optimizer supports what is known as "parameter-aware" query optimization (where the query optimizer knows the value assigned to a query parameter). However, there are limitations when it comes to binding parameter values used for this type of optimization. These parameter values directly influence the filter selectivity, leading to a query plan that is optimized for the bound values. Nevertheless, for different parameter values, the query plan may be suboptimal. This variability in the performance of the query plan, based on parameter values, represents another potential source of performance regression.

Addressing performance regressions can be a complex task due to the multitude of queries and the intricacy of the systems in play. It necessitates a profound comprehension of the query processing engine and the capacity to foresee how alterations in one segment of the DBMS might influence the performance of queries. This is particularly true given the various types of performance regressions (e.g., long response times, high resource consumption, etc.), each of which can be influenced by multiple factors. In a cloud-based database management system, these challenges are further amplified due to the distributed nature of the system, the variability of network conditions, and the need for effective resource allocation among multiple tenants. Manually managing these regressions is not technically feasible, especially in large-scale systems where numerous queries are executed concurrently.

The technology described herein provides an automatic performance regression management (hereinafter "Auto-PRM") framework. Such Auto-PRM framework is designed to intelligently identify and mitigate performance regressions, thereby optimizing query execution and enhancing overall system performance in a multi-tenant cloud-based database environment.

Example Computing System Supporting Auto-PRM

FIG. 1 shows an overall block diagram of an example database management system 100 supporting Auto-PRM. The database management system 100 can be configured to support multi-tenancy, which is a feature in many types of cloud computing services. In a multi-tenancy environment, one instance of a software application and supporting infrastructure (e.g., virtual machines, memories, etc.) can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. Importantly, the underlying data of the tenants can be kept separate and secure.

As shown, the database management system 100 includes a query processing engine 130 and a protocol layer 120 which serves as an interface between one or more tenants 110 and the query processing engine 130. For example, the protocol layer 120 can implement a server name indication protocol by which the tenants 110 can connect to the query processing engine 130. Each tenant 110 represents a group of users who can access a tenant-specific database (e.g., data storage 105) managed by the database management system 100.

In some examples, the query processing engine 130 can include a cache manager 140, a query parser 150, a query optimizer 160, a query executor 170, and a hint manager 180. The cache manager 140 can access a plan cache 122. The plan cache 122 represents a fast-access memory space configured to store previously compiled query plans.

An incoming query 112 sent from a tenant 110 can be processed by the hint manager 180 to output a query 114, which can be the same as or different from the incoming query 112. The hint manager 180 maintains a hint registry 128, which can include one or more pairs of query statements and corresponding statement hints, or simply hints (i.e., each query statement in the hint registry 128 has a paired hint). The query statements stored in the hint registry 128 can be patterned (e.g., with wildcard expressions) or non-patterned (e.g., literal queries, queries including explicit object names, etc.).

Some of the incoming queries 112 can include hint commands, such as commands for adding a hint, removing a hint, enabling a hint, disabling a hint, etc. Based on the received hint commands, the hint manager 180 can update the hint registry 198. For example, responsive to receiving a command to add a hint to a query statement, the hint manager 180 can add the pair of query statement and the hint to the hint registry 128. Conversely, responsive to receiving a command to remove hint(s) for a query statement, the hint manager 180 can delete the pair of query statement and the corresponding hint(s) from the hint registry 128. The hint manager 180 can also enable or disable hint(s) registered in the hint registry 128 based on the received hint commands.

The hint manager 180 is also configured to search the hint registry 128 to identify if an incoming query 112 matches one of the query statements stored in the hint registry 128. If a matching query statement is found, the corresponding hint can be appended (or added) to the incoming query 112. In other words, the incoming query 112 is modified by the hint paired with the matching query statement. The modified query (i.e., the incoming query 112 appended with the hint) is propagated downstream of the hint manager 180, e.g., processed by the cache manager 140, query parser 150, query optimizer 160, etc. On the other hand, if no matching query statement is found, the incoming query 112 is not modified, and can be directly passed to the cache manager 140 for query processing.

The hint manager 180 can use string comparison to determine if the incoming query 112 matches any of the query statements. For each patterned query statement stored in the hint registry 128, a wildcard expression contained in the patterned query statement can match one or more characters of the incoming query when performing the string comparison.

The cache manager 140 receives the query 114 (which can be the incoming query 112 appended with a hint or the unmodified incoming query 112) sent from the hint manager 180. The cache manager 140 can evaluate the received query 114 to determine if the query 114 has a corresponding (compiled) query plan stored in the plan cache 122.

If the cache manager 140 finds no query plan in the plan cache 122 that corresponds to the query 114, the query 114 can be analyzed by the query parser 150, which can check if the query 114 contains syntactic and/or semantic errors. After verifying that the query 114 is a valid transactional SQL statement (e.g., SELECT, INSERT, UPDATE, DELETE, MERGE, etc.), the query parser 150 can generate a logical tree (also referred to as a "query tree") in which the query 114 can be executed.

As described herein, a query tree is a logical representation of the query statement. It includes a plurality of nodes and edges linking the nodes. The nodes can include leaf nodes and one or more internal nodes. A leaf node has no child nodes. In contrast, an internal node has one or more child nodes. The root of the query tree, or root node, can be regarded as a special internal node. The query tree denotes a relational algebra expression. Specifically, tables involved in the query can be represented as leaf nodes. The relational algebra operations can be represented as internal nodes. The root node represents the query as a whole. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

The logical tree can be used by the query optimizer 160 to generate a corresponding query plan, which determines how the query 114 will be executed. The query optimizer 160 is configured to select a query plan (among a plurality of query plans that are generated based on enumeration of the logical tree) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best query plan may not be selected, but the selected query plan is deemed better than others based on data available to the query optimizer 160.

The determined optimal query plan can then be sent to the query executor 170 for execution. The query executor 170 can communicate with a data storage 105 and execute operators in the query plan determined by the query optimizer 160. Data retrieved from the data storage 105 can be returned to the tenant 110 via the protocol layer 120.

In some examples, during execution of the query plan, the query executor 170 can collect runtime statistics 172 (denoted as "RT statistics") for selected nodes of a query tree representing the query plan. These collected runtime statistics can be used to determine data statistics more accurately for corresponding nodes of subsequent query trees. As a result, the query optimizer 160 can calculate the costs of different query plans more accurately. This process can be iterated, allowing the query optimizer 160 to adapt to dynamic changes in data involved in a query, such as changes in table sizes and/or data distributions.

As described herein, query compilation refers to the process of converting a query 114 to the optimal query plan (e.g., checking syntactic and/or semantic errors, generating the logical tree, and determining optimal query plan), as described above. Depending on the complexity of the query 114 (e.g., the number of joined tables, etc.) and the query optimization algorithm, query compilation time can be long (e.g., tens of seconds or more). Thus, to improve operational efficiency, the compiled query plan (i.e., the determined most optimal query plan) for the query 114 can be stored in the plan cache 122 so that it can be quickly retrieved and reused if the same query is encountered again in the future.

For example, if the cache manager 140 determines that the query 114 has a corresponding query plan stored in the plan cache 122, that query plan can be fetched directly from the plan cache 122 and forwarded to the query executor 170 for execution. Thus, in this scenario, operations by the query parser 150 and query optimizer 160 can be bypassed. In other words, the query 114 does not need to be recompiled because its previously compiled query plan is available in the plan cache 122.

The plan cache 122 is configured to store compiled query plans. For each received query 114, the cache manager 140 checks if it has a compiled query plan stored in the plan cache 122. If yes, then this cached query plan can be reused. This can improve efficiency because it eliminates the time of compiling the query 114 (i.e., regenerating the query plan). On the other hand, if the query 114 has no compiled query plan stored in the plan cache 122, the query 114 has to be compiled. The compiled query plan can then be stored in the plan cache 122 so that when the same query 114 occurs again in the future, fast access to its cached query plan is feasible.

If the received query 114 is new (i.e., a first-time query that has not been encountered before), this new query has no corresponding query plan in the plan cache 122 and it must be compiled for the first time. On the other hand, if the received query 114 is old (i.e., the same query has been encountered at least once before), whether or not there is a corresponding compiled query plan in the plan cache 122 can depend on the size of the plan cache 122 and a plan eviction policy adopted by the cache manager 140.

The plan cache 122 has a limited size. Thus, it may not be able to store all compiled query plans. When the plan cache 122 approaches its full capacity, certain query plans may have to be evicted from the plan cache 122 to make room for new ones according to a predefined plan eviction policy implemented by the cache manager 140. For example, the cache manager 140 can implement a random plan eviction policy which evicts query plans from the plan cache 122 in a random manner. In another example, the cache manager 140 can implement the least recently used (LRU) plan eviction policy which removes the least recently used query plans first from the plan cache 122. In yet another example, the least frequently used (LFU) plan eviction policy can be used which first evicts the execution policies that are used least often. Other plan eviction policies can also be used by the cache manager 140.

As described above, performance regression of query plans can occur, e.g., due to a system upgrade and/or data change of the database management system 100. To mitigate potential performance regression of query plans, the query plan optimizer 160 can communicate with an automatic performance regression manager, denoted as Auto-PRM 162, which is configured to detect performance regression and automatically find solutions to resolve these issues, thereby ensuring optimal performance and efficiency of the database management system 100.

As described more fully below, the Auto-PRM 162 can use different approaches to manage performance regression. In some examples, the Auto-PRM 162 can utilize an execution history 124, which stores a list of serialized query plans, also referred to as abstract query plans ("ASPs"), and their corresponding execution statistics (e.g., the execution time, the CPU consumption, the peak memory usage, etc.). The execution history 124 can be used to implement a feature called "plan stability." Plan stability operates by capturing selected query plans and storing them in the execution history 124. If performance regression for a query plan occurs, these stored ASPs can be reused to regenerate the original query plans, thereby retaining the original performance. Data stored in the execution history 124 can be persisted to a persistence layer 126. The execution history 124 can be stored in a volatile memory, which allows for fast access and manipulation of the data. The persistence layer 126 ensures that the ASPs and execution statistics are retained even when the volatile memory is cleared during a system restart. This allows for the data to be reloaded from the persistence layer 126 back into the execution history 124 in the memory, e.g., after the system restart, ensuring the continuity of plan stability.

In some examples, the database management system 100 can further include an Auto-PRM coordinator 190 configured to disseminate knowledge about automatic performance regression management across multiple tenants 110. For example, a tenant might acquire knowledge about a performance regression exhibiting a specific pattern and discover a corresponding solution to rectify this regression. This knowledge can be encapsulated into a distinct knowledge object 192. The Auto-PRM coordinator 190 can then share this knowledge object 192 with another tenant, thereby promoting a collaborative and efficient approach to performance regression management in the multi-tenant database management system 100.

In practice, the systems shown herein, such as database management system 100, can vary in complexity, with additional functionality, more complex components, and the like. For example, there can be additional functionality within the query processing engine 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The database management system 100 and any of the other systems described herein can be implemented in conjunction with any of the hardware components described herein, such as the computing systems described below (e.g., processing units, memory, and the like). In any of the examples herein, the queries, query plans, runtime statistics, hints, knowledge objects, and the like can be stored in one or more computer-readable storage media or computer-readable storage devices. The technologies described herein can be generic to the specifics of operating systems or hardware and can be applied in any variety of environments to take advantage of the described features.

Example Components of Auto-PRM

Figure 2:
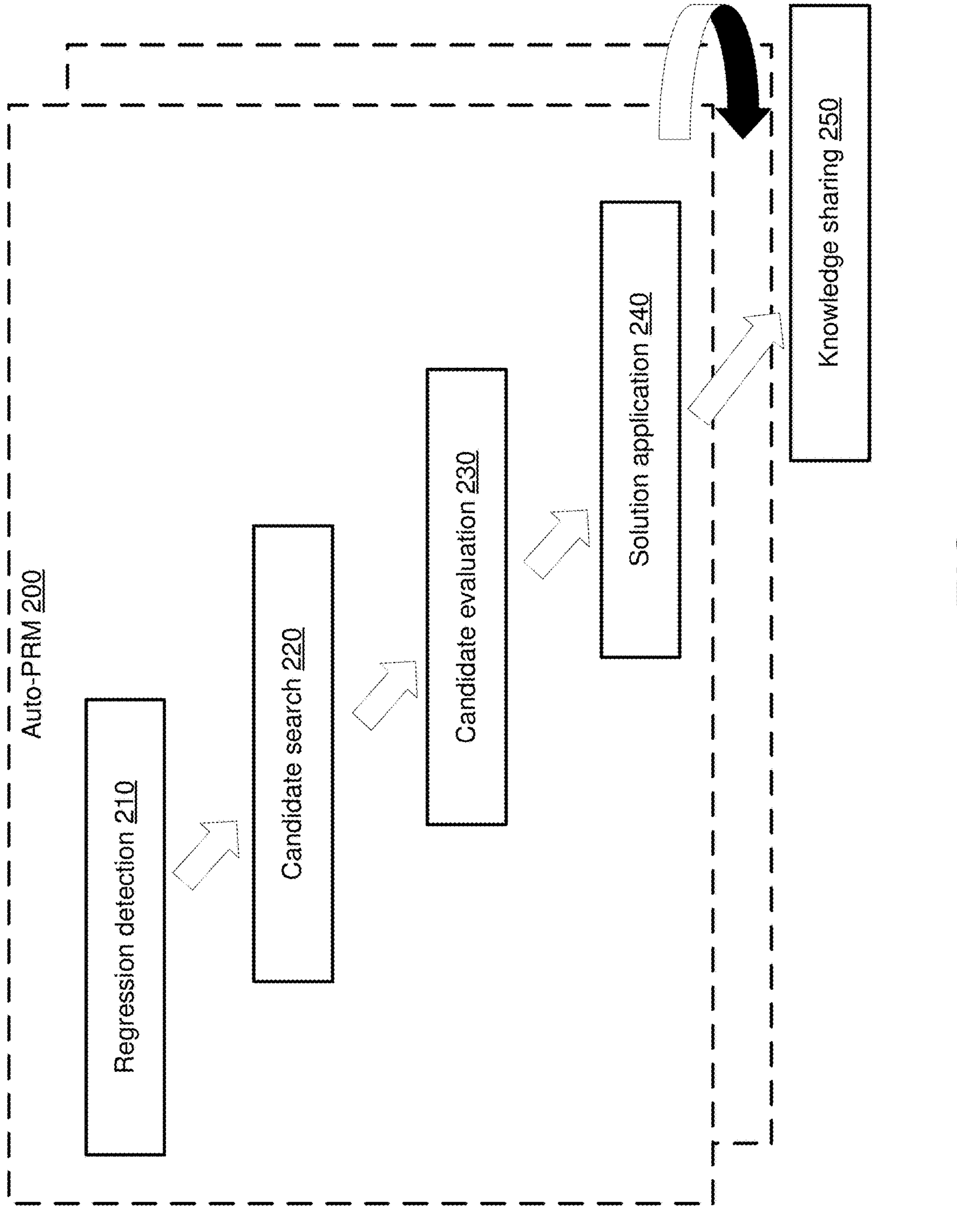
FIG. 2 is a block diagram depicting different phases involved in automatic performance regression management.

FIG. 2 illustrates different phases of automatic performance regression management. In some examples, each tenant of a database management system can implement its own Auto-PRM process 200, which has multiple phases with different tasks such as regression detection 210 (e.g., for detecting performance regression for a query), candidate search 220 (e.g., for identifying candidate solutions that potentially can resolve the detected performance regression), candidate evaluation 230 (e.g., for evaluating if any of the identified candidate solutions is effective to resolve the performance regression), and solution application 240 (e.g., to apply an effective solution for future processing of the query). In some examples, the Auto-PRM process 200 can further include knowledge sharing 250 across tenants. For example, based on the detected patterns of performance regression and identified solutions that resolve the performance regression, one or more knowledge objects can be constructed, which can be shared among multiple tenants.

Figure 3:
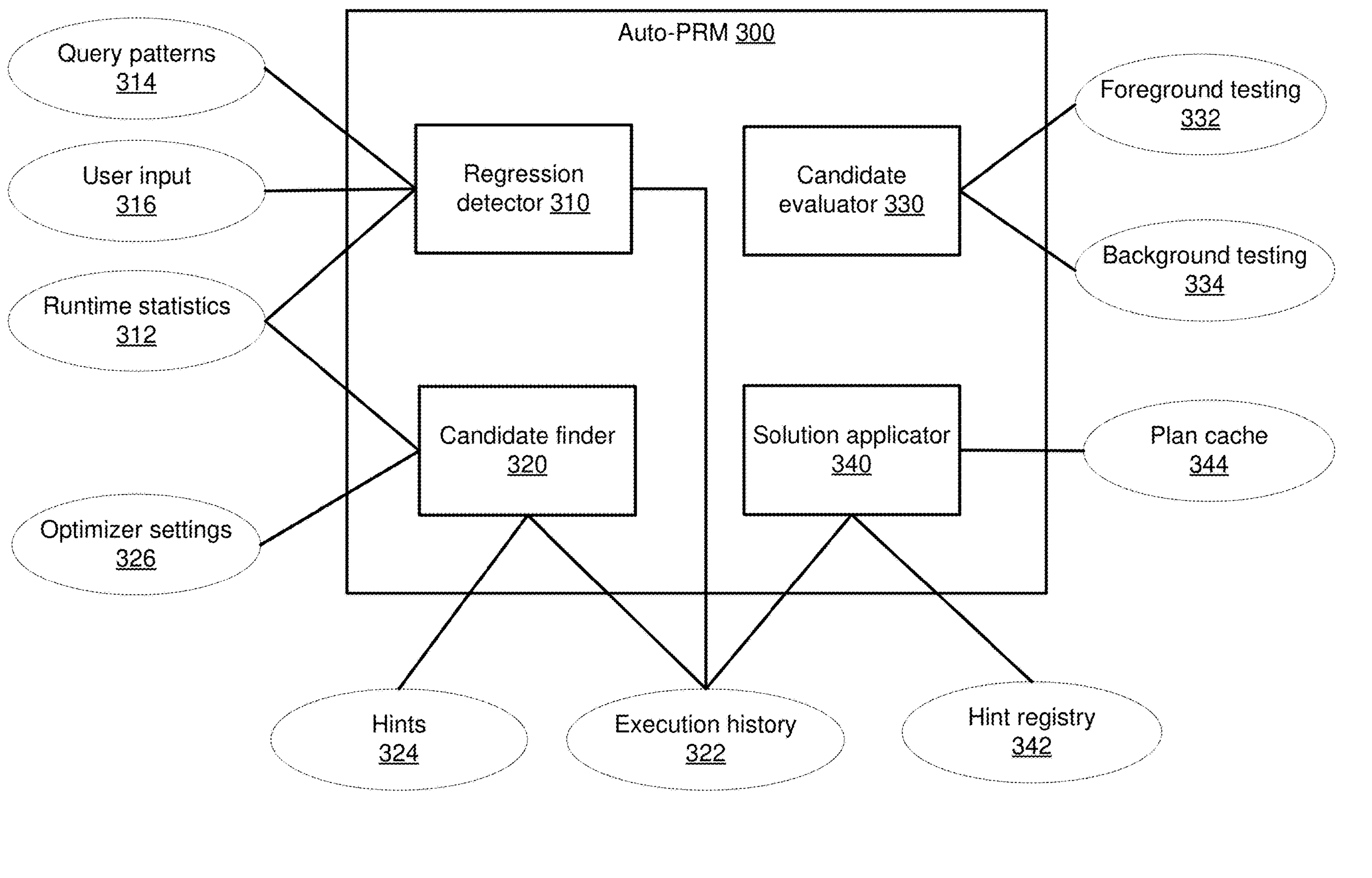
FIG. 3 is a block diagram depicting example modules of an automatic performance regression manager and operational options for each module.

FIG. 3 depicts example modules of an Auto-PRM 300 (which can be an example embodiment of the Auto-PRM 162 of FIG. 1) configured to implement the Auto-PRM process 200 of FIG. 2. As shown, the Auto-PRM 300 includes a regression detector 310 configured to detect performance regression for a query (e.g., the regression detection 210), a candidate finder 320 configured to search for candidate solutions that may resolve the detected performance regression (e.g., the candidate search 220), a candidate evaluator 330 configured to assess if there is an effective solution among the candidate solutions (e.g., candidate evaluation 230), and a solution applicator 340 configured to apply the effective solution (if found) for future processing of the same query (e.g., solution application 240).

Each module of the Auto-PRM 300 can have multiple operational options. For example, the regression detector 310 can use different methods to detect performance regression for a query. These methods may use runtime statistics 312 (similar to the runtime statistics 172) in conjunction with performance data stored in an execution history 322 (similar to the execution history 124), identify specific patterns in query statements 314, and/or based on user input 316. The candidate finder 320 can identify candidate solutions by searching ASPs stored in the execution history 322, applying predefined hints 324 to query statements 314, utilizing feedback of runtime statistics 312 for query optimization, and/or modifying query optimizer settings 326 (e.g., forcing the query optimizer to perform exhaustive plan enumeration). The candidate evaluator 330 can assess the identified candidate solution using either foreground testing 332 (which could impact user workload performance) or background testing 334 (which would not directly affect user workload performance). After the candidate evaluator 330 identifies an effective solution (to resolve the detected performance regression), the solution applicator 340 can store it for future processing of the same query. The effective solution can be stored in a plan cache 344 (similar to the plan cache 122), the execution history 322, or a hint registry 342 (similar to the hint registry 128), depending on its characteristics. Further details of the operational options of each module are described more fully below.

Example Overall Methods for Auto-PRM

Figure 4:
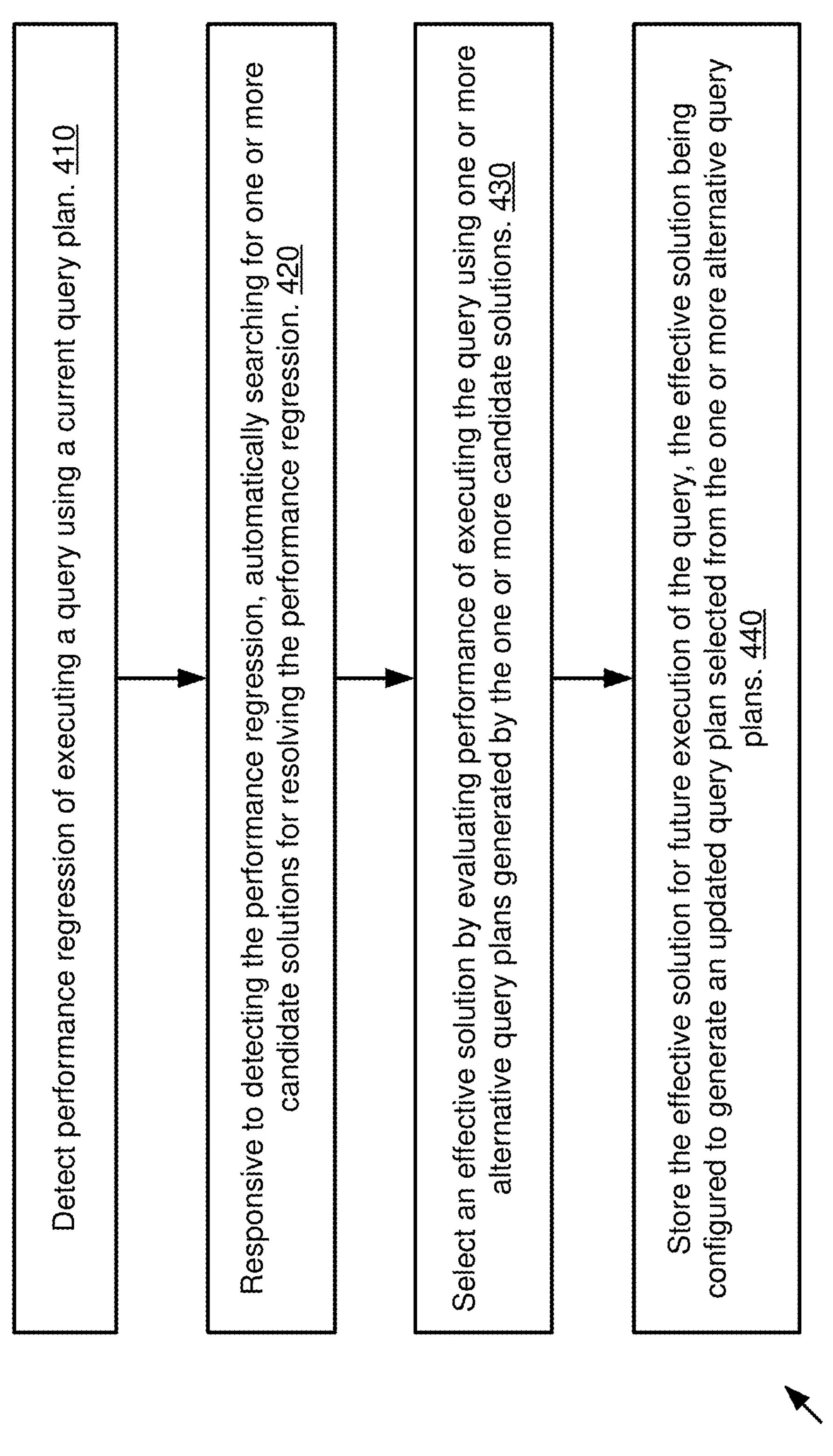
FIG. 4 is a flowchart illustrating an example overall method of implementing automatic performance regression management.

FIG. 4 is a flowchart illustrating an overall method 400 of implementing Auto-PRM, and can be performed, for example, by the database management system of FIG. 1. Specifically, the Auto-PRM feature can be performed by the Auto-PRM 162 of FIG. 1 or Auto-PRM 300 of FIG. 3.

At 410, the method can detect performance regression of executing a query using a current query plan. Detection of performance regression can be performed, e.g., by the regression detector 310 of FIG. 3.

At 420, responsive to detecting the performance regression, the method can automatically search for one or more candidate solutions for resolving the performance regression. Searching candidate solutions can be performed, e.g., by the candidate finder 320 of FIG. 3.

At 430, the method can select, from the one or more candidate solutions, an effective solution that resolves the performance regression. The selecting can include evaluating performance of executing the query using one or more alternative query plans generated by the one or more candidate solutions. Such evaluation can be performed, e.g., by the candidate evaluator 330 of FIG. 3.

At 430, the method can store the effective solution for future execution of the query. In other words, the effective solution will be applied when processing the same query in the future. The effective solution is configured to generate an updated query plan selected from the one or more alternative query plans. The updated query plan has better performance than the current query plan for executing the query. Storing the effective solution can be performed, e.g., by the solution applicator 340 of FIG. 3.

Figure 5:
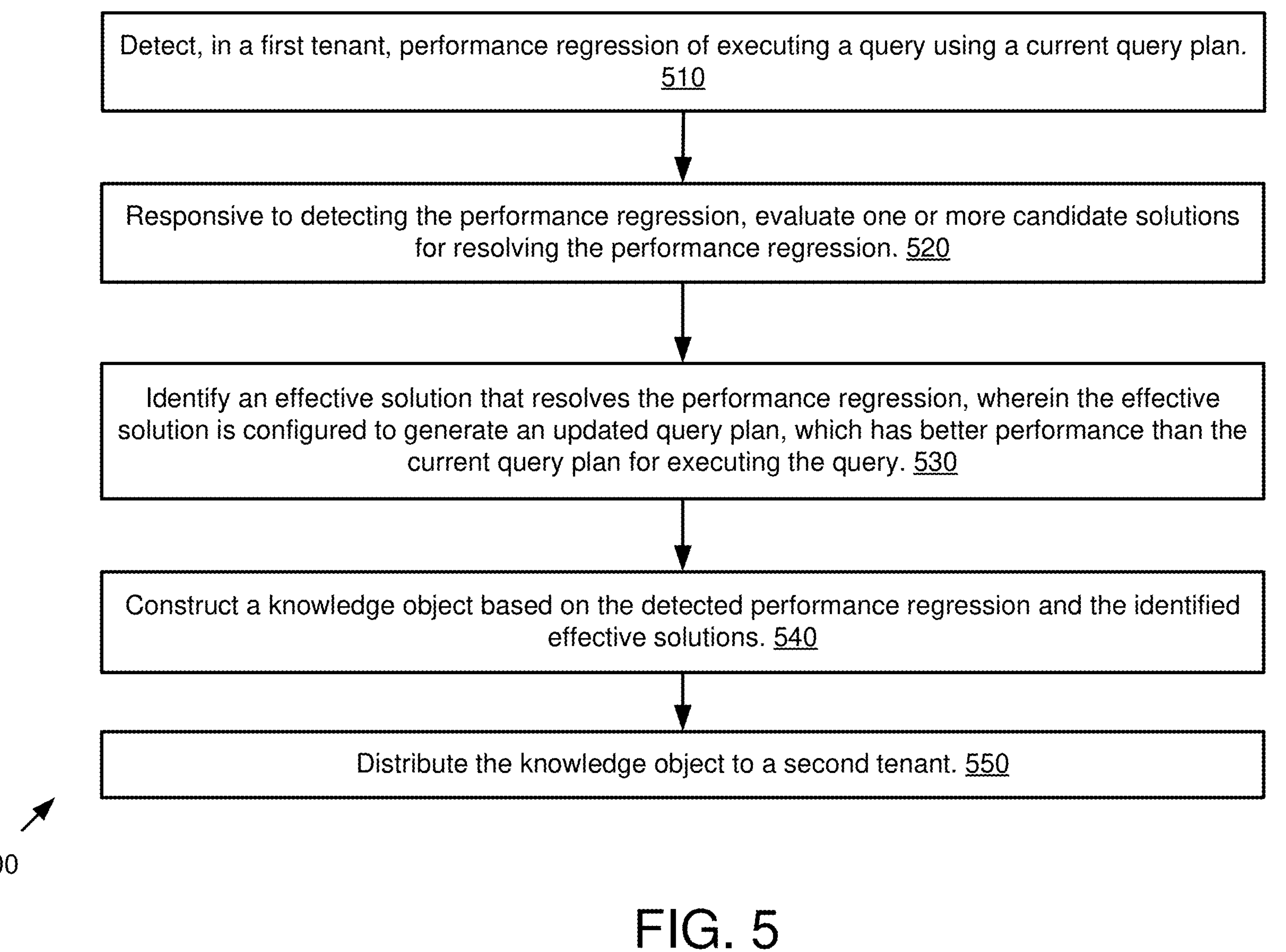
FIG. 5 is a flowchart illustrating an example overall method of implementing knowledge sharing of automatic performance regression management between tenants.

FIG. 5 is a flowchart illustrating an overall method 500 of sharing Auto-PRM knowledge for multi-tenant database management, and can be performed, for example, by the Auto-PRM coordinator 190 of FIG. 1 in conjunction with the Auto-PRM 162 (or Auto-PRM 300 of FIG. 3).

At 510, the method can detect, in a first tenant, performance regression of executing a query using a current query plan. Detection of performance regression can be performed, e.g., by the regression detector 310 of FIG. 3.

At 520, responsive to detecting the performance regression, the method can evaluate one or more candidate solutions for resolving the performance regression. The candidate solutions can be identified, e.g., by the candidate finder 320, and the evaluation can be performed, e.g., by the candidate evaluator 330 of FIG. 3.

At 530, the method can identify, from the one or more candidate solutions, an effective solution that resolves the performance regression. The effective solution is configured to generate an updated query plan, which has better performance than the current query plan for executing the query. The effective solution can be identified based on results of evaluating the candidate solutions at 520.

At 540, the method can construct a knowledge object (e.g., the knowledge object 192 of FIG. 1) based on the detected performance regression and the identified effective solution.

Then, at 550, the method can distribute the knowledge object to a second tenant (different from the first tenant). Management of the knowledge objects, including distribution of the knowledge objects, can be performed, e.g., by the Auto-PRM coordinator 190 of FIG. 1.

The methods 400 and 500, and any other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Performance Measures

As described herein, the performance of executing a query using a query plan can be evaluated based on predefined criteria that involve multiple metrics.

For instance, one performance metric can be execution time of the query. A query plan that leads to a short query execution time can be generally considered superior to one that necessitates longer query execution time. Metrics pertaining to consumed computing resources (e.g., CPU time, peak memory consumption, etc.) can also be used to measure performance. For example, a query plan that uses less CPU time (thus, leaving more resources available for other processes) to execute a query can be deemed better than another query plan that uses more CPU time. Similarly, among different query plans for the same query, the one that consumes less memory can be deemed preferable as it reduces the likelihood of memory-related bottlenecks.

In certain circumstances, multiple metrics can be combined into a composite score to provide a holistic view of the query plan's performance. The specific weights assigned to each metric in the composite score can be predefined by a user depending on the system's requirements and the nature of the workload. For example, in a system with limited memory, the weight assigned to peak memory consumption might be higher. As another example, in a time-critical application where response speed is paramount, the weight assigned to query execution time might be given more importance. In some cases, exclusively considering query execution time might be appropriate, meaning that this is the only metric taken into account when evaluating the performance of query plans.

In certain scenarios, the performance of various query execution plans can be assessed based on predefined rules that involve the simultaneous evaluation of multiple conditions. For example, let's consider two query execution plans, A and B. A predefined rule might determine that query plan A performs better than query plan B if it meets two conditions: (a) The execution time of query plan A is at least X times faster than that of query plan B; and (b) The CPU consumption for executing query plan A does not exceed Y times that of executing query plan B, where X and Y are user-configurable parameters. This rule can strike a balance between execution speed and resource usage, contributing to the overall health and efficiency of the database system. Depending on the circumstances, additional rules can be formulated.

Example Execution History

In some examples, history of past query executions can be retained in an execution history, such as the execution history 124 of FIG. 1.

In some examples, for each query, the execution history can keep the performance metrics (e.g., query execution time, CPU time, peak memory usage, etc.) collected during previous execution of the query. Thus, performance regression can be automatically detected based on comparison of current performance metrics (e.g., obtained when processing an incoming query) with previous performance metrics stored in the execution history, as described further below.

In some examples, session variables and other runtime specific information collected during execution of the query can also be stored in the execution history, along with the corresponding performance metrics. This could include the number of threads allocated, available CPU and memory, the type and version of the DBMS used, the size of the data set being queried, the network latency, etc. These factors can affect query performance independent of the used query plan. For instance, if a query previously executed with a certain query plan used 20% of available CPU and memory resources and completed in 5 minutes, but a recent execution of the same query with the same query plan took the same amount of time but used 80% of the resources, this could indicate a performance regression. Even though the execution time remained the same, the increased resource usage could suggest inefficiencies that weren't present in the previous execution. In other words, the session-related information can be used in conjunction with performance metrics in performance analysis.

In some examples, query plans that were previously used to execute the query can also be stored in the execution history, along with corresponding performance metrics collected when executing the query using those query plans. For instance, previously compiled query plans for a query can be serialized into abstract query plans or ASPs, which can be stored in the execution history. A serialized ASP can have a data exchange format (e.g., JSON, etc.) that can be read/written by a query optimizer (e.g., the query optimizer 160 of FIG. 1). In some examples, the ASPs stored in the execution history can be used to mitigate performance regression, such as the plan stability feature implemented in SAP HANA, provided by SAP SE of Walldorf, Germany. In plan stability, consistent optimal performance of select statements can be ensured by capturing ASPs in a data storage so that the same query plan can be reused when the query is executed again. Example ASP storage and methods of capturing query plans are described in U.S. Pat. Nos. 11,748,349 and 11,556,538, both of which are incorporated herein by reference in their entireties. As described further below, some of the query plans stored in the execution history may be identified as candidate solutions to resolve performance regression.

In some examples, metadata of query objects and/or information used by the query optimizer to generate the query plans can also be saved in the execution history. A query can include one or more query objects (e.g., tables, views, indexes, etc.). Metadata of the query objects can include definitions or logical structure of these query objects. By comparing the current metadata of an object with the metadata of a saved ASP, the system can determine whether the logical structure of the object has changed. For instance, if there are changes in the object parameters that define its logical structure, such as the number of attributes, names of the attributes, data types of the attributes, etc., the previously stored ASP involving the object may be deemed invalid and not reusable for plan stability purposes, and it may not be chosen as a candidate solution to resolve query regression, as described below. Additionally, the information used by the query optimizer can also change over time, which may render a saved ASP invalid and non-reusable (thus, it may not be chosen as a candidate solution to resolve query regression). For example, changes in the usage of hints, estimated size of operators, data distribution, or the presence or absence of an index for a column can all affect the optimization of a query. If these factors change, the query may need to be recompiled, even if the logical structure of the query objects remains the same.

Example Hint Registry

In some examples, one or more hints can be added to an incoming query to generate a query plan. Management of the hints can be handled by a hint registry, such as the hint registry 128 of FIG. 1.

The hint registry can store hint records, each of which includes a hint target and a hint paired to the hint target. The hint target can be a query statement or one or more database objects. A hint manager (e.g., the hint manager 180 of FIG. 1) can search the hint registry to identify if an incoming query matches any of the hint records. If a match is found, the hint specified in the hint record can be added to the incoming query, modifying it into a new query. This modified query is then propagated downstream for further processing (e.g., to compile a query plan). If no matching hint record is found, the incoming query is not modified and is passed directly for downstream query processing.

The query statement included in a hint record can be patterned or non-patterned. As described herein, a patterned query statement includes a wildcard expression, whereas a non-patterned is absent of a wildcard. A wildcard expression can be a special character or sequence of characters that matches any character or set of characters in a string. This wildcard can take various forms, including matching any literals, matching literals within a set of constants, matching literals within a range, or matching literals that start with a specific string or are of a specific datatype. String comparison can be used to determine if a received query matches any of the query statements stored in the hint registry.

For instance, consider an incoming query statement: SELECT * FROM users WHERE name LIKE 'John %'. Suppose there exists a patterned query statement in the hint registry that matches this incoming query, such as SELECT * FROM users WHERE name LIKE $$?$$. Also suppose that a hint, such as (NO_USE_HEX_PLAN), is paired with this patterned query statement in the hint record. Thus, when the hint manager identifies that the incoming query matches the patterned query statement in the hint record, it can add the hint to the incoming query for downstream query optimization.

Example Methods for Detecting Performance Regression

In any of the examples described herein, the Auto-PRM can detect performance regression for executing a query. For example, the Auto-PRM can have a detection logic (e.g., the regression detector 310 of FIG. 3) configured to detect performance regression using a variety of methods.

In some examples, the Auto-PRM can leverage performance data stored in an execution history (e.g., the execution history 124 of FIG. 1 or 322 of FIG. 3) in detection performance regression. Specifically, the Auto-PRM can be configured detect the performance regression by comparing one or more performance metrics of executing the query using a current query plan with corresponding performance metrics stored in the execution history. As described above, the execution history can keep the corresponding performance metrics collected during previous execution of the query. If the current query plan's performance metrics (e.g., execution time and/or resource consumption) are significantly worse than those of previous performance metrics, it may indicate a performance regression. This comparison can be made for each metric individually, or a composite score based on multiple metrics, or based on specific rules, as described above. The specific criteria for determining a regression can be predefined based on the system's requirements and the nature of the workload.

For instance, performance regression can be detected based on query execution time. In one specific example, performance regression can be detected if the query execution time of executing the query using the current query plan is M times greater than an average of N most recent query execution times stored in the execution history, wherein M is predefined and greater than 1 (e.g., M can be 1.5, 2, 2.5, 3, 4, 5, etc.), and N is a predefined positive integer (e.g., N can be 1, 2, 3, 4, 5, 6, 7, 8, or more). In other words, a moving window of the most recent N query execution times can be used to detect performance regression. If the execution time of the current query plan is M times greater than the average execution time in this window, a performance regression is detected. Alternatively, instead of using the average of the N most recent query execution times, the median value could be used.

Figure 6:
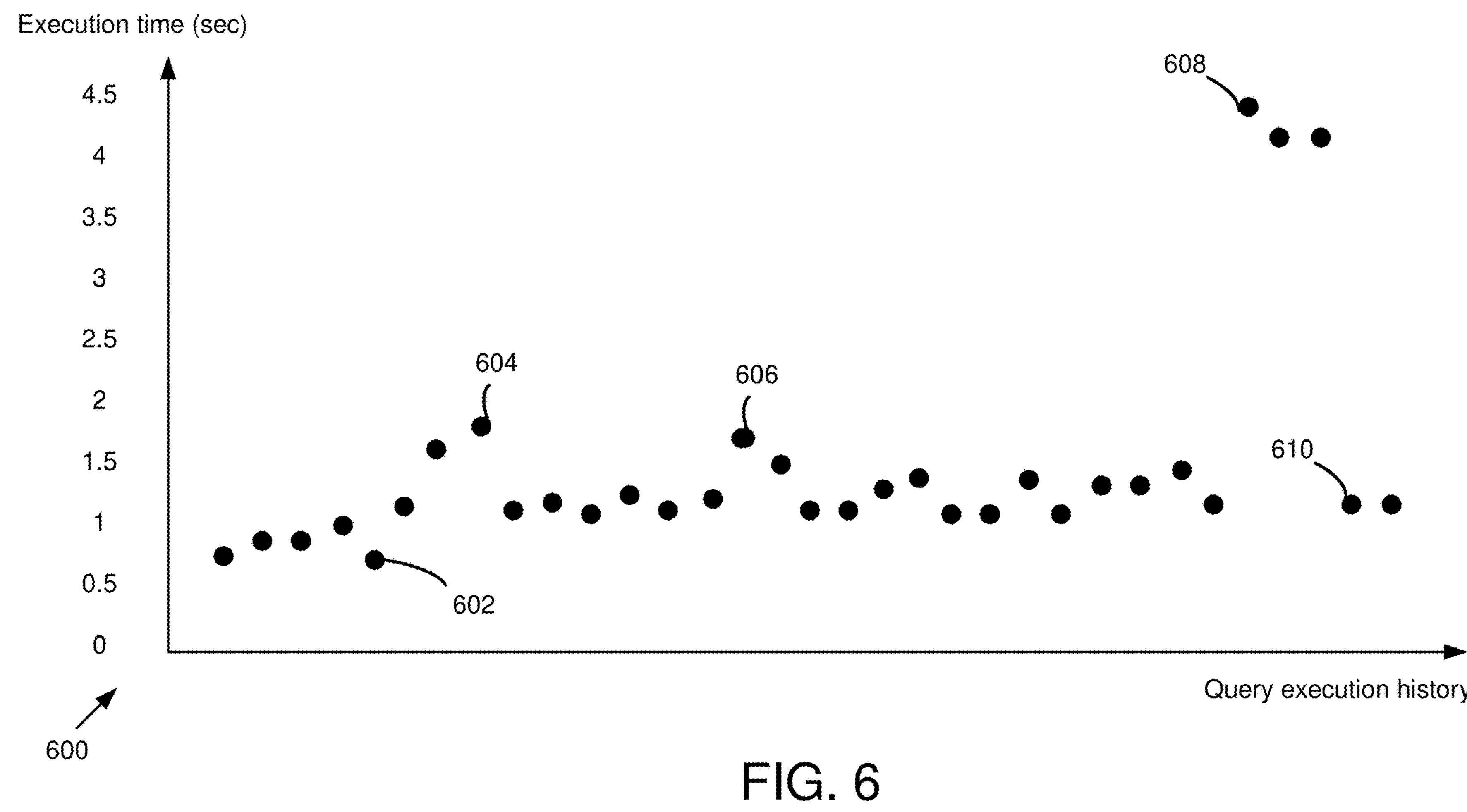
FIG. 6 is a schematic diagram illustrating a method for detecting performance regression based on data stored in a query execution history.

FIG. 6 provides a schematic representation of the time history for the execution of a query. The graph exhibits some variability, particularly noticeable for query execution times at 604 and 606. However, the query execution time remained within an acceptable range of fluctuation, specifically, no more than twice the moving average. As a result, the Auto-PRM did not detect performance regression at those times. On the other hand, the query execution time at 608 is found to exceed an acceptable limit (e.g., five times the moving average of most recent eight executions). This significant deviation triggers detection of performance regression, indicating a need for potential adjustments to improve the query's performance.

In some examples, a confirmation phase can be implemented to prevent false positives in performance regression detection. This phase could be based on an x-out-of-y criteria or similar, ensuring that a single significant deviation of a performance metric, which could be an outlier (e.g., due to unusual data distribution), does not trigger regression detection. For instance, as shown in FIG. 6, the detection of regression can be confirmed after finding three consecutive significant deviations of execution time. Only after this confirmation is the performance regression is confirmed, which can trigger a candidate solution search (as described further below) to find an effective solution to resolve the regression. As a result of this process, the execution time returns to normal at 610, which could be based on reusing a legacy query plan associated with the execution time at 602.

In some examples, analysis of performance regression cases can reveal that some specific query patterns can cause the query optimizer to make non-optimal decisions and consequently generate a query plan which leads to bad performance. Such patterns, also referred to as anti-patterns hereinafter, can be predefined for Auto-PRM. As descried herein, an anti-pattern can be defined based on a logical structure of the query plan, which can be serialized into an ASP or other equivalent formats depicting the query plan. For example, the ASP can specify a logical tree structure defining relationship between a plurality of query operations. An anti-pattern can include a subtree of the logical tree structure. In some examples, an anti-pattern can further include some runtime statistic information, such as data distribution of a table column, selectivity of a filter, correlation between table columns, etc. Once an anti-pattern is detected (e.g., by the regression detector 310 of FIG. 3), it can indicate performance regression and trigger candidate search to find an effective solution to mitigate the regression.

One example anti-pattern is an index join with a post-filter, especially in skewed data distribution. This pattern can cause the query optimizer to underestimate the selectivity of a post-filter, leading to an index join operation that may not be optimal. For example, if the joined values have large duplicates, the actual result size of the index join can become significantly larger than estimated, leading to performance degradation.

Another example anti-pattern is the absence of pre-aggregation with multiple grouping columns, which can have a large size estimation error (over-estimation). The result size of a group-by operation with multiple grouping columns highly depends on the correlation between the columns. However, if the query optimizer does not consider this correlation and overestimates the result size, it may choose a sub-optimal query plan.

Yet another example anti-pattern is an index join with large duplicates. If an index join is selected but the searched value in the index has many duplicates, the index join can suffer performance degradation. In this case, the optimizer should choose a different join algorithm (e.g., hash join) that does not rely on the index.

Another method of detecting performance regression is based on the detection of insufficient plan enumeration. As described above, the query optimizer can use a variety of enumeration rules to enumerate many possible query plans, one of which will be selected or deemed as an optimal query plan for query execution. However, the query optimizer may have a plan enumeration limit, which is configured to prevent it from enumerating all possible query plans. For example, consider a scenario where an application defines its data model using complex views that depend on other complex views. When a single query on one of these views is processed, the query optimizer flattens the views into inline views, resulting in a large plan with numerous operations and tables. This complexity can be further compounded when a join operation is pushed down under a union all operation, effectively multiplying the single join by the number of union children. The search space for this complex plan becomes so large that it is difficult for the query optimizer to enumerate all possible alternative plans within its configured plan enumeration limit. If the query optimizer fails to fully enumerate all possible alternative query plans, this information can be marked in the resulting query plan. Thus, a query plan marked with insufficient plan enumeration may indicate performance regression.

In some examples, a user can manually tag or label a query plan (e.g., a query plan stored in the plan cache, etc.) to have a regressed performance or likely will lead to performance regression. This can be used, e.g., when the query was newly introduced by other applications, or when the execution history lacks sufficient data (e.g., shortly after database system upgrade) to support automatic regression detection described above. After detecting such a regression tag or label, Auto-PRM can enter the candidate search phase to identify an effective solution to resolve the performance regression, as described further below.

Example Methods for Searching Candidate Solutions

After detecting performance regression or a high likelihood of performance regression when executing a query using a current query plan, the Auto-PRM can automatically trigger a search to identify candidate solutions that can resolve the performance regression. For example, the Auto-PRM can have a search module (e.g., the candidate finder 320 of FIG. 3) configured to search for candidate solutions using a variety of methods.

In some examples, for each query, the execution history (e.g., the execution history 124 of FIG. 1 or 322 of FIG. 3) can store one or more legacy query plans previously generated for the query, along with corresponding performance metrics previously obtained when executing the query using those legacy query plans. At least some of the legacy query plans stored in the execution history can be identified as candidate solutions if those legacy query plans have better performance than the current query plan for executing the query.

For example, each of the legacy query plan stored in the execution history can have a corresponding query execution time. A candidate solution can be identified if the query execution time corresponding to a selected legacy query plan stored in the execution history is smaller than the query execution time of executing the query using the current query plan. The identified candidate solution specifies the selected legacy query plan as an alternative query plan for execution of the query. For instance, in the example depicted in FIG. 6, after detecting performance regression, the Auto-PRM identifies a legacy query plan with a shorter query execution time at 602. A candidate solution can specify using that legacy query plan to execute the query. In some examples, the search can find multiple legacy query plans stored in the execution history as candidate solutions (e.g., all the plans in the execution history which showed better performance than current performance can be identified as candidate solutions). Although execution time is described above as an example to compare performance, it should be understood that other performance metrics can be used to search for candidate solutions.

In some examples, to search for candidate solutions, the Auto-PRM not only compare performance metrics, but also consider validity of the legacy query plans stored in the execution history. This is because some of the stored legacy query plans, despite having better performance previously, may not be suitable for executing the query anymore. For instance, a query may involve one or more query objects (e.g., a table, a view, etc.). If one of the query objects have different definitions, such as a change in the number of columns, names and/or data types of the columns, etc., the logical structure of the object changes. This change can render the legacy query plan invalid as it was based on the previous definition of the object. Consequently, despite its previous superior performance, this legacy query plan cannot be selected as a candidate solution for resolving performance regression. Additional details of evaluating validity of previously stored query plans are described in U.S. Pat. No. 11,907,217, the entirety of which is incorporated herein by reference.

In some examples, performance regression is detected based on detection of anti-patterns, as described above. In such cases, at least some of the candidate solutions can include applying predefined hint(s) to the query. In other words, a candidate solution can instruct the query optimizer to utilize a paired query hint (or hints) to generate an alternative query plan. Each anti-pattern can have a corresponding hint (or hints). For instance, if the regression comes from the anti-pattern "an index join with a post-filter" or "index join with large duplicates," a hint instructing not using index join (e.g., as in SAP HANA, hint "NO_HEX-_INDEX_JOIN") can be used for the query optimization to avoid generating an index join with the problematic index. As another example, if the regression comes from the anti-pattern "absence of pre-aggregation with multiple grouping columns," a hint which instructs the query optimizer to apply pre-aggregation (group-by) before the join operation can be used. These hints serve as directives to the query optimizer, guiding it towards compiling the query in a way that mitigates the performance regression.

Alternatively, when runtime statistics for an operation involved in execution of the query (e.g., the runtime statistics 312 of FIG. 3 or 172 of FIG. 1) is available, at least some of the candidate solutions can specify compiling the query using thus runtime statistics. In other words, a candidate solution can instruct the query optimizer to utilize runtime statistics to generate an alternative query plan. As described above, some of the anti-patterns are related to the differences between the size estimation during query optimization and the actual size during query execution. Therefore, a runtime feedback loop can be used to adjust the query optimizer's decisions based on the actual execution results. Generally, the runtime statistics collected from the executed query plan can more accurately reflect data statistics of internal nodes (representing query operations generating intermediate results) in the query trees. As a result, cost-based query optimization using runtime statistics can be more accurate (compared to the estimates). Additional details of using runtime statistics to improve query optimization are described in U.S. Pat. No. 11,803,545, the entirety of which is incorporated herein by reference.

Thus, if performance regression is detected due to anti-patterns, the candidate solutions can specify applying hints or using runtime statistics, or both. While hints can guide the query optimizer towards a certain path, they are applied broadly to the entire query, affecting all query objects. On the other hand, runtime statistics provide a more granular and targeted approach. They allow the optimizer to make informed decisions based on actual data from specific operations or query objects, such as the size of a table column. Thus, in some circumstances, candidate solutions that are based on runtime statistics can be deemed to have a higher priority than candidate solutions that are based on hints.

As described above, performance regression can be caused by insufficient plan enumeration. Thus, if a query's performance regresses and the query plan is marked as having insufficient plan enumeration, at least one candidate solution can specify compiling the query through an exhaustive plan enumeration (e.g., by temporarily ignoring or lifting the preconfigured plan enumeration limit) to generate an alternative query plan.

In some examples, a user can also define candidate solutions for a user-labelled or known plan regression. For instance, after a database system upgrade, if the new A query execution engine is found to have regressed compared to the previous B query execution engine, the user can define a candidate solution, which applies a hint to the query to instruct the query optimizer to generate an alternative query plan by using the B query execution engine instead of the A query execution engine.

Example Methods for Evaluating Candidate Solutions

After finding candidate solutions to the detected performance regression, the Auto-PRM can trigger evaluation of the candidate solutions to determine if any of those candidate solutions is effective in resolving the performance regression. For example, the Auto-PRM can evaluate the candidate solutions (e.g., via the candidate evaluator 330 of FIG. 3) using either foreground testing or background testing.

In foreground testing (also referred to as "A/B testing"), the chosen candidate solution can be directly applied to the user's query input, thus affecting the user workload performance. This method does not require additional execution of the candidate solution in the background, as described further below. Instead, it uses the chosen candidate solution for the execution of the regressed query triggered by the user's query input. If the performance regression is resolved by a candidate solution, that candidate solution is determined to be an effective solution, which will be applied to the subsequent execution of the regressed query, as described further below.

As described herein, the effective solution specifies an updated query plan which is different from the current query plan that is associated with performance regression. To qualify for an effective solution, the performance of the updated query plan must satisfy one or more predefined performance criteria. For example, one criterion may require that the query execution time of executing the query using the updated query plan is less than a predefined fraction (e.g., 50%, 25%, etc.) of the query execution time of executing the query using the current query plan. Other criteria such as usage of CPU and/or peak memory consumption can be specified, as needed.

Foreground testing in Auto-PRM can utilize predefined rules to prioritize the evaluation of different candidate solutions. For instance, candidate solutions that use query plans stored in the plan cache or ASP stored in execution history can be evaluated first, followed by other candidate solutions that require recompilation of the query. The Auto-PRM can also use different strategies to determine an effective solution from the evaluated candidate solutions. One example approach is to evaluate multiple candidate solutions and compare the results to find the best performing one. Alternatively, if a candidate solution is found to resolve the performance regression, it can be identified as the effective solution, eliminating the need to further evaluate other candidate solutions, even if they might potentially offer better performance. To ensure reliability, the evaluation of each candidate solution can be repeated, with average performance metrics used to provide more reliable evaluation results.

During foreground testing, the Auto-PRM can be configured to handle exceptional behaviors. For instance, if the response time of the evaluation exceeds K times (where K is a user-defined parameter, e.g., K=3, 5, 8, etc.) that of the previous query plan, the evaluation can be cancelled and the Auto-PRM can automatically switch back to the previous query plan and run again. As another example, if the evaluation stops due to an exception, the exception can be internally handled by the A/B testing, and the previous query plan is rerun, ensuring that the user's query processing is not interrupted. In the event of a system crash during evaluation, the Auto-PRM can keep the new query plan along with the crash information to prevent the system failure from repeating.

Figure 7:
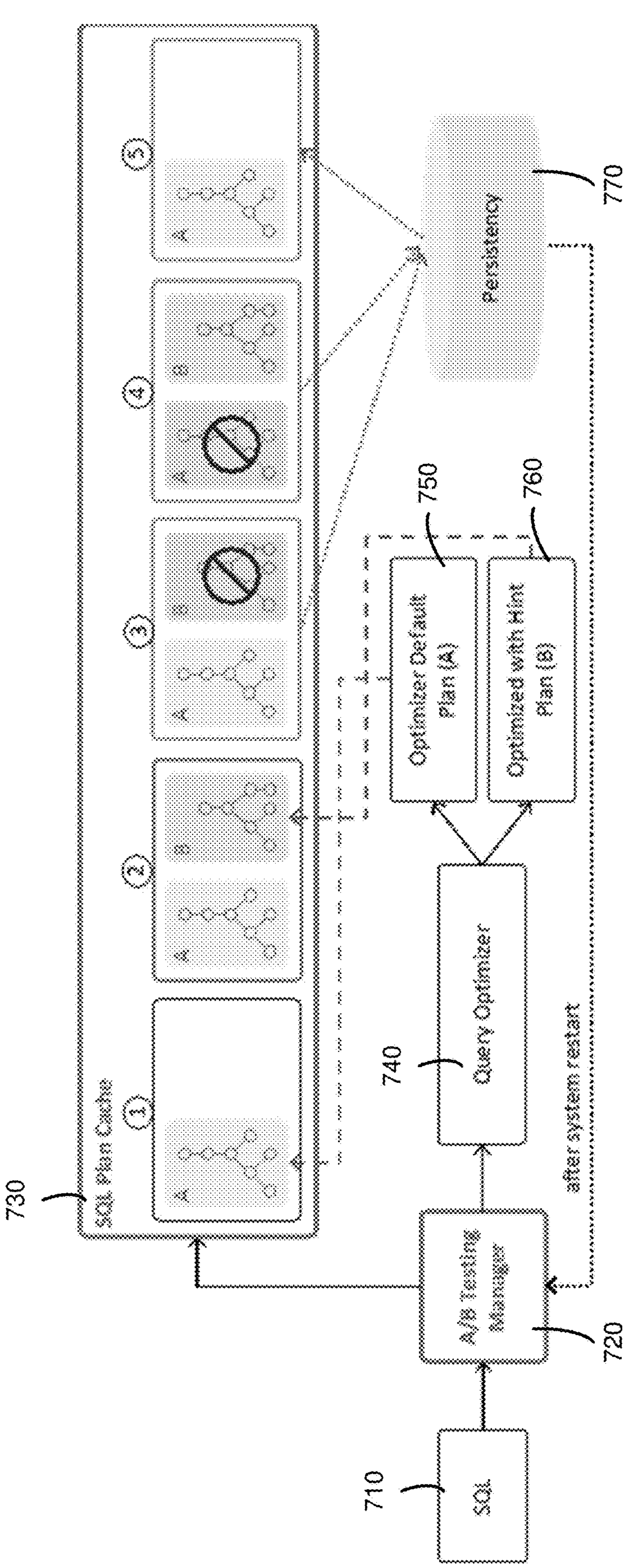
FIG. 7 is a schematic diagram illustrating evaluation of a candidate solution for resolving performance regression using A/B testing.

FIG. 7 schematically depicts a use case of using A/B testing to evaluate a candidate solution for resolving a performance regression. In this example, a query 710 has a current query plan 750 previously compiled by a query optimizer 740 and stored in a plan cache 730 (denoted by a query tree A shown in box 1). The current query plan 750 has been labelled or previously detected to suffer performance regression (e.g., by the regression detector 310 of FIG. 3). A candidate solution is identified (e.g., by the candidate finder 320 of FIG. 3) to compile the query 710 with a specific hint to generative an alternative query plan. Thus, after receiving the query 710, instead of using the current query plan 750 in the plan cache 730 to execute the query 710, an A/B testing manager 720 (which can a component of the candidate evaluator 330 of FIG. 3) can instruct the query optimizer 740 to recompile the query 710 with the specified hint to generate an alternative query plan 760 (denoted by a query tree B). The alternative query plan 760 can be saved in the plan cache 730 along with the current query plan 750 (as shown in box 2) and used for executing the query 710. The execution performance (e.g., query execution time, CPU consumption, etc.) associated with the alternative query plan 760 can be compared to the execution performance associated with the current query plan 750 to determine if the alternative query plan resolves the performance regression. If so, the candidate solution is determined to be an effective solution, and the alternative query plan 760 is retained in the plan cache 730, whereas the current query plan 750 is removed from the plan cache 730 (as shown in box 4). Otherwise, no effective solution is found, thus the current query plan 750 is retained in the plan cache 730, whereas the alternative query plan 760 is removed from the plan cache 730 (as shown in box 3). If there are additional candidate solutions, similar process can be repeated to evaluate performance of alternative query plans generated by those additional candidate solutions. After completion of the A/B testing, the query plan retained in the plan cache 730 can be stored in a persistent layer 770 (similar to the persistent layer 126 of FIG. 1). Thus, after a system restart, which can clear the plan cache 730 (e.g., a volatile memory), the A/B testing manager 720 can automatically recover the plan cache 730 by retrieving the query plans persisted in the persistent layer 770. For example, FIG. 7 shows that after a system restart, the current query plan 750 is restored in the plan cache 730 (in box 5), assuming that the previous A/B testing did not find an effective solution.

In some examples, evaluation of candidate solutions can be performed by means of background testing, which can mitigate the impact on, or even isolate, the evaluation process from the user's workload. Two different approaches of background testing can be performed. In a first approach, the evaluation can be conducted in a separate thread. For example, detection performance regression can be performed in a first thread of a database system, whereas evaluating the candidate solutions can be performed in a second thread of the database system. This approach ensures that the user's workload is not directly impacted by the evaluation process, provided the system has sufficient idle resources, such as CPU and memory. However, if the system is heavily loaded with user tasks, the evaluation needs to be conducted more carefully, e.g., by limiting the number of threads used for evaluation and/or restricting the available memory to a configurable value. In a second approach, the evaluation can be performed on a separate instance, e.g., an Elastic Compute Node (ECN), which is a cloud-based service that provides resizable compute capacity. This approach can completely isolate the user's workload from the evaluation process, but it will require that the data distribution of the original system be accurately replicated in the ECN for the evaluation process.

Example Methods for Applying Solutions to Mitigate Performance Regression

After an effective solution for resolving the performance regression of a query is identified, the effective solution can be stored and applied for future execution of the query. For example, depending on types of the effective solution, the Auto-PRM can have different mechanism to store and apply the effective solution (e.g., by the solution applicator 340 of FIG. 3) for future execution of the query.

For example, if an effective solution is found after A/B testing, as described above, an updated query plan (corresponding to the effective solution) is already compiled and stored in the plan cache. In this scenario, the query optimizer does not need to regenerate the query plan. Instead, the updated query plan stored in the plan cache can be used for future execution of the query. In other words, the Auto-PRM can store the effective solution in the plan cache.

As another example, if an effective solution is found (either through foreground testing or background testing) to use a legacy query plan stored in the execution history to resolve the performance regression, then the Auto-PRM can label that legacy query plan to be used for future execution of the query. In other words, the Auto-PRM can store the effective solution in the execution history.

In yet another example, if an effective solution is found (either through foreground testing or background testing) to be recompiling the query with a hint, then the Auto-PRM can register a hint record in a hint registry (e.g., the hint registry 128 of FIG. 1). The hint record can include the query (or a patterned query statement representing the query) and the hint. Thus, when the query is received again in the future, that query will be compiled with the hint. In other words, the Auto-PRM can store the effective solution in the hint registry.

Example Methods for Sharing Auto-PRM Knowledge

In the context of a multi-tenant database management system, the detection of performance regressions and their corresponding effective solutions can be seen as valuable experiences. These experiences, when analyzed, can reveal specific patterns that form a body of knowledge. In some examples, each tenant can have its own local Auto-PRM. The knowledge of Auto-PRM gained from each tenant can be encapsulated into distinct knowledge objects, which can be centrally stored and disseminated, e.g., by the Auto-PRM coordinator 190 of FIG. 1, across multiple tenants. By sharing these knowledge objects, other tenants can proactively prevent similar performance regressions, fostering a collaborative and efficient approach to managing performance regressions in the multi-tenant database management system.

As described herein, a knowledge object can be constructed, e.g., by an administrator or a developer of the database system, based on a detected performance regression of executing a query using a current query plan and the identified effective solution that can resolve the performance regression. The knowledge object can be specified in a data exchange format (e.g., JSON, etc.) which can be understood by a query optimizer and exchanged between different tenants. Each knowledge object can include a pattern definition (representing the query or the current query plan) and a solution definition. The pattern definition can specify a pattern of the detected performance regression, and the solution definition can specify the corresponding effective solution. Thus, once constructed, a knowledge object can be distributed to multiple tenants, each of which can apply the effective solution to prevent similar performance regressions in their respective systems.

In some examples, the pattern definition in a knowledge object can specify a subtree pattern in a logical tree structure of the current query plan. As described above, the logical tree structure defines relationship between a plurality of query operations. Thus, the subtree pattern can capture relationship of one or more operations included in the current query plan. If a query plan has a matching subtree pattern defined in the knowledge object, that query plan can be deemed to have a high risk of performance regression.

As an example, FIG. 8 shows a subtree 800 of a query plan associated with performance regression. The subtree 800 is characterized by an anti-pattern "an index join with a post-filter." Specifically, the subtree 800 has a parent node 802 representing index join operation with a post-filter, and two child nodes 804, 806 that are joined. Here, the post-filter refers to a filter that can be applied to the table represented by the child node 806, the index of which is used for the index join. However, this post-filter is not applied prior to the join operation. This is because if the filter were applied to table represented by the child node 806 before the join operation represented by the parent node 802, the table's index could not be used for the index join. Instead, a hash join would have to be used. Such anti-pattern, as described above, can be indicative of performance regression.

The subtree pattern depicted in FIG. 8 can be specified in a knowledge object 900 in JSON format, as shown in FIG. 9. For example, the knowledge object 900 has a "subtree pattern" (indicating the pattern definition is based on a subtree pattern of a query plan), which includes three operators with a parent-child relationship as depicted in FIG. 8. In some examples, the subtree pattern can further specify a condition associated with the performance regression. For example, FIG. 9 shows that the performance regression is not only characterized by the anti-pattern, but also is associated with a large estimation error (e.g., the actual result size of the index join is more than 1000 times larger than the estimated size).

As shown in FIG. 9, the knowledge object 900 further specifies an effective solution for the corresponding subtree pattern. In the depicted example, the effective solution is adding a hint "NO_HEX_INDEX_JOIN" to the query. In other words, if a query plan matches the subtree pattern specified in the knowledge object 900, the likely performance regression can be mitigated by compiling the query with the specified hint.

In some examples, the pattern definition in a knowledge object can specify a query statement representing the query. In other words, the query itself can represent a knowledge pattern. This may occur, e.g., when a tenant adopts a distributed application which has known performance regression for certain queries.

Figure 10:
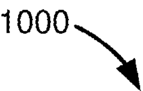
FIG. 10 depicts an example knowledge object including a pattern definition specifying a query statement.

The query statement specified in the knowledge object can be non-patterned (e.g., identical to the query itself) or patterned (e.g., including a wildcard expression that matches one or more characters of the query). As an example, FIG. 10 shows a knowledge object 1000 written in JSON format. The knowledge object 1000 has a "statement" type (indicating the pattern definition specifies a query statement). Specifically, the knowledge object 1000 defines a patterned query statement: SELECT * FROM T WHERE A=$$%$$. Additionally, the knowledge object 1000 specifies an effective solution, which is adding a hint "NO_HEX_INDEX_JOIN" to the query. A tenant receiving the knowledge object 1000 can register the patterned query statement and the corresponding hint in its hint registry. Thus, when a query matches the patterned statement SELECT * FROM T WHERE A=$$%$$, the hint NO_HEX_INDEX_JOIN will be automatically applied to the query when the query optimizer generates a query plan.

Example Advantages

The Auto-PRM framework described herein offers significant technical advantages by automating the complex task of managing performance regressions in a multi-tenant database management system.

The disclosed technologies can automatically navigate through different phases of query performance regression management, such as regression detection, candidate solution search, candidate evaluation, and solution application. This automation is particularly beneficial in large-scale, multi-tenant cloud-based database environments where numerous queries may be executed concurrently, and performance regressions can occur due to a variety of factors. As such, the automatic nature of this framework significantly reduces the need for manual intervention, thereby reducing the likelihood of human error and enhancing efficiency.

The disclosed Auto-PRM framework exhibits remarkable versatility by incorporating multiple methods for each phase of performance regression management. For regression detection, it can utilize performance metrics from execution history, identify anti-patterns in query statements, use run-time statistics, and even consider user input. This multi-faceted approach allows for a more comprehensive and accurate detection of performance regressions. Similarly, in the candidate search phase, the framework can leverage ASPs stored in execution history, feedback from runtime statistics, and statement hints to identify potential solutions. This ensures a wide range of possible solutions are considered. In the candidate evaluation phase, both foreground and background testing can be employed, allowing for a thorough assessment of the effectiveness of each candidate solution without significantly impacting user workload performance. In the solution application phase, the effective solution can be stored in various locations such as the plan cache, execution history, or hint registry, ensuring optimal retrieval and application for future query processing.

Furthermore, the Auto-PRM framework disclosed herein supports knowledge sharing in a multi-tenant database management system. This knowledge sharing is facilitated through the creation and distribution of knowledge objects, which encapsulate valuable experiences and solutions related to performance regressions. These knowledge objects can define performance regression patterns in a versatile manner such as subtree patterns or query statements and specify effective solutions to mitigate those regressions. Once created, these knowledge object can be disseminated across multiple tenants, enabling them to proactively prevent similar performance regressions, thereby fostering a collaborative and efficient approach to managing performance regressions in the multi-tenant database environment.

Example Computing Systems

Figure 11:
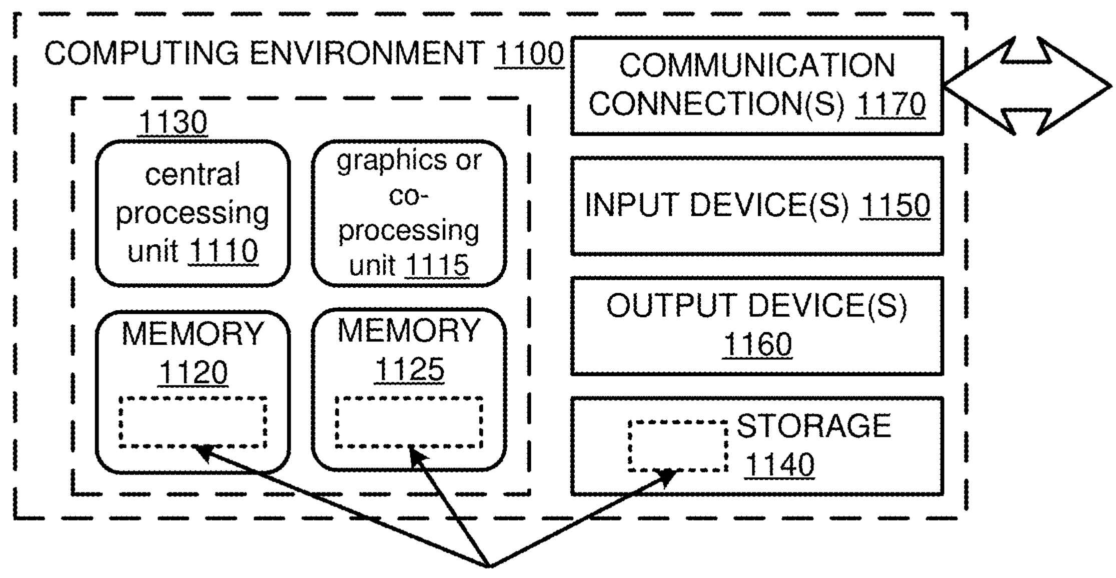
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the methods 400 and 500). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 12:
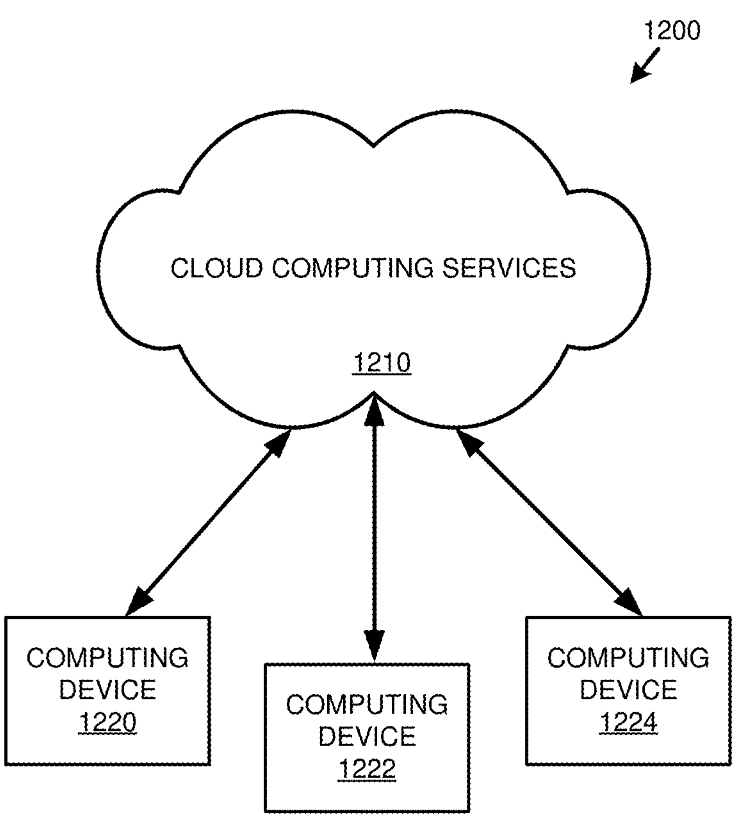
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method comprising: detecting performance regression of executing a query using a current query plan; responsive to detecting the performance regression, automatically searching for one or more candidate solutions for resolving the performance regression; selecting, from the one or more candidate solutions, an effective solution that resolves the performance regression, wherein the selecting comprises evaluating performance of executing the query using one or more alternative query plans generated by the one or more candidate solutions; and storing the effective solution for future execution of the query, wherein the effective solution is configured to generate an updated query plan selected from the one or more alternative query plans, wherein the updated query plan has better performance than the current query plan for executing the query.

Clause 2. The method of clause 1, wherein detecting the performance regression comprises comparing one or more performance metrics of executing the query using the current query plan with corresponding performance metrics stored in an execution history.

Clause 3. The method of clause 2, wherein the one or more performance metrics comprise query execution time, wherein the performance regression is detected if the query execution time of executing the query using the current query plan is M times greater than an average of N most recent query execution times stored in the execution history, wherein M is predefined and greater than 1, and N is a predefined positive integer.

Clause 4. The method of clause 2, wherein the execution history stores one or more legacy query plans previously generated for the query, wherein the searching comprises identifying at least some of the legacy query plans stored in the execution history have better performance than the current query plan for executing the query.

Clause 5. The method of clause 4, wherein the one or more performance metrics comprise query execution time, wherein a candidate solution is identified if the query execution time corresponding to a selected legacy query plan stored in the execution history is smaller than the query execution time of executing the query using the current query plan, wherein the identified candidate solution specifies the selected legacy query plan as an alternative query plan.

Clause 6. The method of clause 5, wherein the effective solution specifies the updated query plan, wherein the query execution time of executing the query using the updated query plan is less than a predefined fraction of the query execution time of executing the query using the current query plan, wherein query objects included in the current query plan have identical object definitions as corresponding query objects included in the updated query plan.

Clause 7. The method of any one of clauses 1-6, wherein detecting the performance regression comprises identifying a predefined subtree pattern in a logical tree structure of the current query plan, wherein the logical tree structure defines relationship between a plurality of query operations.

Clause 8. The method of clause 7, wherein at least one of the candidate solutions specifies compiling the query with a query hint.

Clause 9. The method of clause 7, further comprising collecting runtime statistics for an operation involved in execution of the query using the current query plan, wherein at least one of the candidate solutions specifies compiling the query using the runtime statistics.

Clause 10. The method of any one of clauses 1-9, wherein detecting the performance regression comprises identifying the current query plan was generated with an insufficient plan enumeration, wherein at least one of the candidate solutions specifies compiling the query through an exhaustive plan enumeration.

Clause 11. A computing system, comprising: memory; one or more hardware processors coupled to the memory; and one or more computer readable storage media storing instructions that, when loaded into the memory, cause the one or more hardware processors to perform operations comprising: detecting performance regression of executing a query using a current query plan; responsive to detecting the performance regression, automatically searching for one or more candidate solutions for resolving the performance regression; selecting, from the one or more candidate solutions, an effective solution that resolves the performance regression, wherein the selecting comprises evaluating performance of executing the query using one or more alternative query plans generated by the one or more candidate solutions; and storing the effective solution for future execution of the query, wherein the effective solution is configured to generate an updated query plan selected from the one or more alternative query plans, wherein the updated query plan has better performance than the current query plan for executing the query.

Clause 12. The system of clause 11, wherein detecting the performance regression comprises comparing one or more performance metrics of executing the query using the current query plan with corresponding performance metrics stored in an execution history.

Clause 13. The system of clause 12, wherein the one or more performance metrics comprise query execution time, wherein the performance regression is detected if the query execution time of executing the query using the current query plan is M times greater than an average of N most recent query execution times stored in the execution history, wherein M is predefined and greater than 1, and N is a predefined positive integer.

Clause 14. The system of clause 12, wherein the execution history stores one or more legacy query plans previously generated for the query, wherein the searching comprises identifying at least some of the legacy query plans stored in the execution history have better performance than the current query plan for executing the query.

Clause 15. The system of clause 14, wherein the one or more performance metrics comprise query execution time, wherein a candidate solution is identified if the query execution time corresponding to a selected legacy query plan stored in the execution history is smaller than the query execution time of executing the query using the current query plan, wherein the identified candidate solution specifies the selected legacy query plan as an alternative query plan.

Clause 16. The system of clause 15, wherein the effective solution specifies the updated query plan, wherein the query execution time of executing the query using the updated query plan is less than a predefined fraction of the query execution time of executing the query using the current query plan, wherein query objects included in the current query plan have identical object definitions as corresponding query objects included in the updated query plan.

Clause 17. The system of any one of clauses 11-16, wherein detecting the performance regression comprises identifying a predefined subtree pattern in a logical tree structure of the current query plan, wherein the logical tree structure defines relationship between a plurality of query operations.

Clause 18. The system of clause 17, wherein at least one of the candidate solutions specifies compiling the query with a query hint.

Clause 19. The system of clause 18, wherein the operations further comprise collecting runtime statistics for an operation involved in execution of the query using the current query plan, wherein at least one of the candidate solutions specifies compiling the query using the runtime statistics.

Clause 20. One or more non-transitory computer-readable media having encoded thereon computer-executable instructions causing one or more processors to perform a method comprising: detecting performance regression of executing a query using a current query plan; responsive to detecting the performance regression, automatically searching for one or more candidate solutions for resolving the performance regression; selecting, from the one or more candidate solutions, an effective solution that resolves the performance regression, wherein the selecting comprises evaluating performance of executing the query using one or more alternative query plans generated by the one or more candidate solutions; and storing the effective solution for future execution of the query, wherein the effective solution is configured to generate an updated query plan selected from the one or more alternative query plans, wherein the updated query plan has better performance than the current query plan for executing the query.

Clause 21. A computer-implemented method for multi-tenant database management, the method comprising: detecting, in a first tenant, performance regression of executing a query using a current query plan; responsive to detecting the performance regression, evaluating one or more candidate solutions for resolving the performance regression; identifying, from the one or more candidate solutions, an effective solution that resolves the performance regression, wherein the effective solution is configured to generate an updated query plan, which has better performance than the current query plan for executing the query; constructing a knowledge object based on the detected performance regression and the identified effective solution; and distributing the knowledge object to a second tenant.

Clause 22. The method of clause 21, wherein the knowledge object comprises a pattern definition and a solution definition, wherein the pattern definition specifies a pattern of the detected performance regression, wherein the solution definition specifies the identified effective solution.

Clause 23. The method of clause 22, wherein the pattern definition specifies a subtree pattern in a logical tree structure of the current query plan, wherein the logical tree structure defines relationship between a plurality of query operations.

Clause 24. The method of clause 22, wherein the pattern definition specifies a query statement representing the query.

Clause 25. The method of clause 24, wherein the query statement includes a wildcard expression which matches one or more characters of the query.

Clause 26. The method of clause 22, wherein the solution definition specifies a hint, wherein the identified effective solution is configured to generate the updated query plan by compiling the query using the hint.

Clause 27. The method of any one of clauses 21-26, wherein the current query plan is originally stored in a plan cache, wherein evaluating a candidate solution comprises: generating an alternative query plan using the candidate solution; comparing performance of the current query plan and the alternative query plan in executing the query; and replacing the current query plan stored in the plan cache with the alternative query plan if the alternative query plan has better performance than the current query plan or discarding the alternative query plan if the current query plan has better performance than the alternative query plan.

Clause 28. The method of clause 27, wherein after evaluating the candidate solution, storing the alternative query plan in a persistent layer if the alternative query plan has better performance than the current query plan or storing the current query plan persistent layer if the current query plan has better performance than the alternative query plan.

Clause 29. The method of any one of clauses 21-28, wherein detecting performance regression is performed in a first thread on a first compute node of the first tenant, wherein evaluating one or more candidate solutions is performed in a second thread of the first computer node or on a second compute node of the first tenant.

Clause 30. The method of any one of clauses 21-29, further comprising storing the effective solution for future execution of the query, wherein the storing comprises saving the updated query plan or registering a hint for a patterned query statement representing the incoming query.

Clause 31. A computing system for multi-tenant database management, comprising: memory; one or more hardware processors coupled to the memory; and one or more computer readable storage media storing instructions that, when loaded into the memory, cause the one or more hardware processors to perform operations comprising: detecting, in a first tenant, performance regression of executing a query using a current query plan; responsive to detecting the performance regression, evaluating one or more candidate solutions for resolving the performance regression; identifying, from the one or more candidate solutions, an effective solution that resolves the performance regression, wherein the effective solution is configured to generate an updated query plan, which has better performance than the current query plan for executing the query; constructing a knowledge object based on the detected performance regression and the identified effective solution; and distributing the knowledge object to a second tenant.

Clause 32. The system of clause 31, wherein the knowledge object comprises a pattern definition and a solution definition, wherein the pattern definition specifies a pattern of the detected performance regression, wherein the solution definition specifies the identified effective solution.

Clause 33. The system of clause 32, wherein the pattern definition specifies a subtree pattern in a logical tree structure of the current query plan, wherein the logical tree structure defines relationship between a plurality of query operations.

Clause 34. The system of clause 32, wherein the pattern definition specifies a query statement representing the query.

Clause 35. The system of clause 34, wherein the query statement includes a wildcard expression which matches one or more characters of the query.

Clause 36. The system of clause 32, wherein the solution definition specifies a hint, wherein the identified effective solution is configured to generate the updated query plan by compiling the query using the hint.

Clause 37. The system of any one of clauses 31-36, wherein the current query plan is originally stored in a plan cache, wherein evaluating a candidate solution comprises: generating an alternative query plan using the candidate solution; comparing performance of the current query plan and the alternative query plan in executing the query; and replacing the current query plan stored in the plan cache with the alternative query plan if the alternative query plan has better performance than the current query plan or discarding the alternative query plan if the current query plan has better performance than the alternative query plan.

Clause 38. The system of clause 37, wherein after evaluating the candidate solution, storing the alternative query plan in a persistent layer if the alternative query plan has better performance than the current query plan or storing the current query plan persistent layer if the current query plan has better performance than the alternative query plan.

Clause 39. The system of any one of clauses 31-38, wherein detecting performance regression is performed in a first thread on a first compute node of the first tenant, wherein evaluating one or more candidate solutions is performed in a second thread of the first computer node or on a second compute node of the first tenant.

Clause 40. One or more non-transitory computer-readable media having encoded thereon computer-executable instructions causing one or more processors to perform a method for multi-tenant database management, the method comprising: detecting, in a first tenant, performance regression of executing an incoming query with a query syntax using a current query plan; responsive to detecting the performance regression, evaluating one or more candidate solutions for resolving the performance regression; detecting, in a first tenant, performance regression of executing a query using a current query plan; responsive to detecting the performance regression, evaluating one or more candidate solutions for resolving the performance regression; identifying, from the one or more candidate solutions, an effective solution that resolves the performance regression, wherein the effective solution is configured to generate an updated query plan, which has better performance than the current query plan for executing the query; constructing a knowledge object based on the detected performance regression and the identified effective solution; and distributing the knowledge object to a second tenant.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for multi-tenant database management, the method comprising:

detecting, in a first tenant, performance regression of executing a query using a current query plan;

responsive to detecting the performance regression, evaluating one or more candidate solutions for resolving the performance regression;

identifying, from the one or more candidate solutions evaluated for their ability to resolve the detected performance regression, an effective solution that resolves the performance regression, wherein the effective solution is configured to generate an updated query plan, which has better performance than the current query plan for executing the query;

responsive to identifying the effective solution for the first tenant, constructing a knowledge object representing the query or the current query plan associated with the detected performance regression, wherein the knowledge object specifies the identified effective solution, wherein the knowledge object comprises a pattern definition, wherein the pattern definition specifies a pattern of the detected performance regression; and distributing, to a second tenant, the knowledge object that was constructed based on regression detection and identification of the effective solution in the first tenant, wherein the first tenant and the second tenant represent two different user groups of a multi-tenancy environment.

2. The method of claim 1, wherein the knowledge object further comprises a solution definition, wherein the solution definition specifies the identified effective solution.

3. The method of claim 2, wherein the pattern definition specifies a subtree pattern in a logical tree structure of the current query plan, wherein the logical tree structure defines relationship between a plurality of query operations.

4. The method of claim 2, wherein the pattern definition specifies a query statement representing the query.

5. The method of claim 4, wherein the query statement includes a wildcard expression which matches one or more characters of the query.

6. The method of claim 2, wherein the solution definition specifies a hint, wherein the identified effective solution is configured to generate the updated query plan by compiling the query using the hint.

7. The method of claim 1, wherein the current query plan is originally stored in a plan cache, wherein evaluating a candidate solution comprises:

generating an alternative query plan using the candidate solution;

comparing performance of the current query plan and the alternative query plan in executing the query; and replacing the current query plan stored in the plan cache with the alternative query plan if the alternative query plan has better performance than the current query plan or discarding the alternative query plan if the current query plan has better performance than the alternative query plan.

8. The method of claim 7, wherein after evaluating the candidate solution, storing the alternative query plan in a persistent layer if the alternative query plan has better performance than the current query plan or storing the current query plan in the persistent layer if the current query plan has better performance than the alternative query plan.

9. The method of claim 1, wherein detecting performance regression is performed in a first thread on a first compute node of the first tenant, wherein evaluating one or more candidate solutions is performed in a second thread of the first computer node or on a second compute node of the first tenant.

10. The method of claim 1, further comprising storing the effective solution for future execution of the query, wherein the storing comprises saving the updated query plan or registering a hint for a patterned query statement representing the query.

11. A computing system for multi-tenant database management, comprising:

memory;

one or more hardware processors coupled to the memory; and one or more computer readable storage media storing instructions that, when loaded into the memory, cause the one or more hardware processors to perform operations comprising:

detecting, in a first tenant, performance regression of executing a query using a current query plan;

responsive to detecting the performance regression, evaluating one or more candidate solutions for resolving the performance regression;

identifying, from the one or more candidate solutions evaluated for their ability to resolve the detected performance regression, an effective solution that resolves the performance regression, wherein the effective solution is configured to generate an updated query plan, which has better performance than the current query plan for executing the query;

responsive to identifying the effective solution for the first tenant, constructing a knowledge object representing the query or the current query plan associated with the detected performance regression, wherein the knowledge object specifies the identified effective solution, wherein the knowledge object comprises a pattern definition, wherein the pattern definition specifies a pattern of the detected performance regression; and distributing, to a second tenant, the knowledge object that was constructed based on regression detection and identification of the effective solution in the first tenant, wherein the first tenant and the second tenant represent two different user groups of a multi-tenancy environment.

12. The system of claim 11, wherein the knowledge object further comprises a solution definition, wherein the solution definition specifies the identified effective solution.

13. The system of claim 12, wherein the pattern definition specifies a subtree pattern in a logical tree structure of the current query plan, wherein the logical tree structure defines relationship between a plurality of query operations.

14. The system of claim 12, wherein the pattern definition specifies a query statement representing the query.

15. The system of claim 14, wherein the query statement includes a wildcard expression which matches one or more characters of the query.

16. The system of claim 12, wherein the solution definition specifies a hint, wherein the identified effective solution is configured to generate the updated query plan by compiling the query using the hint.

17. The system of claim 11, wherein the current query plan is originally stored in a plan cache, wherein evaluating a candidate solution comprises:

generating an alternative query plan using the candidate solution;

comparing performance of the current query plan and the alternative query plan in executing the query; and replacing the current query plan stored in the plan cache with the alternative query plan if the alternative query plan has better performance than the current query plan or discarding the alternative query plan if the current query plan has better performance than the alternative query plan.

18. The system of claim 17, wherein after evaluating the candidate solution, storing the alternative query plan in a persistent layer if the alternative query plan has better performance than the current query plan or storing the current query plan in the persistent layer if the current query plan has better performance than the alternative query plan.

19. The system of claim 11, wherein detecting performance regression is performed in a first thread on a first compute node of the first tenant, wherein evaluating one or more candidate solutions is performed in a second thread of the first computer node or on a second compute node of the first tenant.

20. One or more non-transitory computer-readable media having encoded thereon computer-executable instructions causing one or more processors to perform a method for multi-tenant database management, the method comprising:

detecting, in a first tenant, performance regression of executing an incoming query with a query syntax using a current query plan;

responsive to detecting the performance regression, evaluating one or more candidate solutions for resolving the performance regression;

detecting, in a first tenant, performance regression of executing a query using a current query plan;

responsive to detecting the performance regression, evaluating one or more candidate solutions for resolving the performance regression;

identifying, from the one or more candidate solutions evaluated for their ability to resolve the detected performance regression, an effective solution that resolves the performance regression, wherein the effective solution is configured to generate an updated query plan, which has better performance than the current query plan for executing the query;

responsive to identifying the effective solution for the first tenant, constructing a knowledge object representing the query or the current query plan associated with the detected performance regression, wherein the knowledge object specifies the identified effective solution, wherein the knowledge object comprises a pattern definition, wherein the pattern definition specifies a pattern of the detected performance regression; and distributing, to a second tenant, the knowledge object that was constructed based on regression detection and identification of the effective solution in the first tenant, wherein the first tenant and the second tenant represent two different user groups of a multi-tenancy environment.

* * * * *